US007996026B2

United States Patent
Nagatomo et al.

(10) Patent No.: US 7,996,026 B2
(45) Date of Patent: Aug. 9, 2011

(54) DATA RECEPTION APPARATUS HAVING DATA DISPLAY FUNCTION

(75) Inventors: Shoichi Nagatomo, Fussa (JP); Yoshiaki Mukai, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 794 days.

(21) Appl. No.: 11/956,164

(22) Filed: Dec. 13, 2007

(65) Prior Publication Data

US 2008/0102868 A1 May 1, 2008

Related U.S. Application Data

(62) Division of application No. 10/400,772, filed on Mar. 27, 2003, now abandoned.

(30) Foreign Application Priority Data

Mar. 28, 2002 (JP) .................................. 2002-092474

(51) Int. Cl.
*H04W 4/00* (2009.01)
*G09G 5/00* (2006.01)
(52) U.S. Cl. ......... 455/466; 345/636; 345/629; 345/641
(58) Field of Classification Search .................. 455/466; 345/636, 629, 641
See application file for complete search history.

(56) References Cited

U.S. PATENT DOCUMENTS

| | | | |
|---|---|---|---|
| 6,546,132 B1 | 4/2003 | Bhattacharjya et al. | 382/167 |
| 6,704,027 B2 * | 3/2004 | Nakano | 345/636 |
| 6,910,186 B2 | 6/2005 | Kim | 715/706 |
| 7,139,014 B1 | 11/2006 | Kim et al. | |
| 2001/0056470 A1 | 12/2001 | Ishitani | |
| 2002/0031262 A1 | 3/2002 | Imagawa et al. | |
| 2002/0049836 A1 | 4/2002 | Shibuya | |
| 2002/0099456 A1 | 7/2002 | McLean | 700/83 |
| 2002/0103822 A1 * | 8/2002 | Miller | 707/501.1 |
| 2002/0113801 A1 | 8/2002 | Reavy et al. | 345/589 |
| 2003/0130990 A1 | 7/2003 | Brown et al. | 707/3 |
| 2003/0236836 A1 | 12/2003 | Borthwick | 709/204 |
| 2004/0263914 A1 | 12/2004 | Yule et al. | 358/402 |

FOREIGN PATENT DOCUMENTS

EP 1182639 A2 2/2002

(Continued)

OTHER PUBLICATIONS

Kinu Tabata, "Hands-on for Beginners: Let's create a pleasant e-mail with attached digital photo and voice" Nikkei PC Beginners, Nikkei Business Publications, Inc., vol. 6, No. 16, pp. 53-65, Aug. 13, 2001 (with English language translation).

(Continued)

*Primary Examiner* — Marisol Figueroa
(74) *Attorney, Agent, or Firm* — Hogan Lovells US LLP

(57) ABSTRACT

Cellular phones (1*a*, 1*b*) adjust the brightness of an image before sending mail with an attached photograph, so that it is possible to visually verify the mail text when the mail text is overlaid over the image, which serves as a background image attached to the mail text at the receiving side, after which the mail is send to a system (in particular, to mail servers (33) and (63)). The color of mail text characters is changed in responsive to the image brightness. When the cellular phones (1*a*, 1*b*) receive an e-mail with an attached photograph, they display the mail text overlaid over the image as a background image (which has had its brightness adjusted).

5 Claims, 24 Drawing Sheets

FOREIGN PATENT DOCUMENTS

| | | |
|---|---|---|
| JP | 05012388 | 1/1993 |
| JP | 08139885 | 5/1996 |
| JP | 2000295667 A | 10/2000 |
| JP | 2001325196 | 11/2001 |
| JP | 2001357408 | 12/2001 |
| JP | 2002140265 A | 5/2002 |

OTHER PUBLICATIONS

Toshiyuki Sakiyama, "Comprehensive Comparative Review, Multimedia Mailer, the 26th article in series" PC Fan, Mainichi Communications Inc., vol. 5, No. 11, pp. 162-167, Jun. 15, 1998 (with English language translation).

Japanese language office action and its English language translation for corresponding Japanese application 2006353569 lists the references above.

Tabata Kinu "Beginner's real actions notes, let's make digital photographs and interesting mail with sounds or voice, let's make a model mail using digital photographs in Nikkei PC Beginners" Nikkei PC21, Supplement of August edition, 2001 vol. 8 pp. 53-67, published by Nikkei Business Publication Co., Ltd.

Chinese language office action and its English language translation for corresponding Chinese application 031088155 lists the reference above.

Dokko et al., "Development of Multimedia E-mail System Providing an Integrated Message View", IEEE Comput. Soc., US, Apr. 28, 1997, pp. 494-498.

\* cited by examiner

| DESTINATION | SUBJECT | BODY | FILE ATTACHMENT ADDRESS | MTF | | 2921 |
|---|---|---|---|---|---|---|
| DESTINATION | SUBJECT | BODY | FILE ATTACHMENT ADDRESS | MTF | DATE/TIME SENT | MSF |
| | | | | | | |
| | | | | | | |
| | SUBJECT | | FILE ATTACHMENT ADDRESS | MTF | DATE/TIME RECEIVED | MRF |
| SENDER | | | | | | |
| | | | | | | |

Columns 2922 and 2923 are bracketed at top.

FIG.17

| | | | | | | | | |
|---|---|---|---|---|---|---|---|---|
| | | | | | | | | 2921 |
| | | | | | | | | 2922 |
| | | | | | | | | 2923 |

| DESTINATION | SUBJECT | BODY | FILE ATTACHMENT ADDRESS | MTF | TEMPLATE NO. | DATE/TIME SENT | MSF | |
| DESTINATION | SUBJECT | BODY | FILE ATTACHMENT ADDRESS | MTF | TEMPLATE NO. | | | |
| | | | | | | | | |
| | | | | | | | | |
| SENDER | SUBJECT | BODY | FILE ATTACHMENT ADDRESS | MTF | TEMPLATE NO. | DATE/TIME RECEIVED | MRF | |
| | | | | | | | | |
| | | | | | | | | |

292

| DESTINATION | SUBJECT | BODY | FILE ATTACHMENT ADDRESS | BDF | CORRECTION VALUE | DATE/TIME SENT | MSF |
|---|---|---|---|---|---|---|---|
| DESTINATION | SUBJECT | BODY | FILE ATTACHMENT ADDRESS | BDF | CORRECTION VALUE | DATE/TIME SENT | |
| | | | | | | | |
| | | | | | | | |
| SENDER | SUBJECT | BODY | FILE ATTACHMENT ADDRESS | BDF | CORRECTION VALUE | DATE/TIME RECEIVED | MRF |
| | | | | | | | |
| | | | | | | | |

DATA RECEPTION APPARATUS HAVING DATA DISPLAY FUNCTION

CROSS-REFERENCE TO THE RELATED APPLICATIONS

This application is a divisional of application Ser. No. 10/400,772 filed Mar. 27, 2003, the entire contents of which are incorporated by reference. This application also claims benefit of priority under 35 U.S.C. §119 to Japanese Patent Application No. 2002-092474 filed Mar. 28, 2002, the entire contents of which are incorporated by reference.

BACKGROUND OF THE INVENTION

1. Field of the Invention

The present invention relates to a data communication apparatus, a data communication system, and a method for data communication.

2. Related Art

In the past, a system existed for exchanging electronic mail (hereinafter referred to also as e-mail or mail) having various attached files. In recent years, an image capturing function has been added to cellular telephones (hereinafter referred to as cell phones) or the like to enable a captured image to be attached to an e-mail and sent to another wireless communication terminal. In the case in which an image attached to an e-mail is displayed at the receiving-side wireless communication terminal, it is usual to display the image independently of the mail body text, and there are also systems in which the image is displayed at the end of the body text of the e-mail.

There is also a known service in which a captured (photographed) image is uploaded to an ISP (Internet service provider) with which user registration has already been done, notification being given to the other party's wireless communication terminal of the URL (universal resource locator) of the uploaded image (link data for accessing the image uploaded to the IPS server). In this case, the URL is displayed along with the mail body text at the receiving-side wireless communication terminal that receives the e-mail, and when the user of the other party's wireless communication terminal specifies this URL, the user's wireless communication terminal is connected to the network and downloads and displays the image data from the server (image database).

In an image display method related to mail service in the past, however, and particularly in the case in of a compact wireless communication terminal, because of problems such as the size of the display screen, it was not possible to display the body text of the mail ad the image simultaneously, and when reading the text of an e-mail, it was extremely difficult to perform simultaneous verification of the image.

Accordingly, it is an object of the present invention to provide a data communication apparatus, a data communication system, and method for data communication, which are capable of implementing easy creation and sending of mail with simultaneous verification of the body text of the mail and the image, and which, even when an e-mail is received having an attached image, enable easy verification of the original image.

SUMMARY OF THE INVENTION

In order to achieve the above-noted object, a first aspect of the present invention is a data communication apparatus having means for preparing a document to be sent, means for preparing an image to be sent, means for setting whether or not the image is to be displayed as a background image for the document on the display of a receiving-side communication apparatus receiving the document, and means for sending, as one set of data, the document, the image and information capable of distinguishing that the image is to be displayed as a background image for the document in a case in which the setting means sets display as a background image.

A second aspect of the present invention for achieving the above-noted object is a data communication apparatus capable of receiving data sent by another data communication apparatus and having means for receiving data, display control means for displaying the image as a background image for the document in a case in which data received by the receiving means includes a document, an image and information that can distinguish that an instruction is given to display the image as a background image for the document.

A third aspect of the present invention for achieving the above-noted object is a data communication system having a first data communication apparatus and a second data communication apparatus, and capable of data communication from the first data communication apparatus to the second data communication apparatus, wherein the first data communication apparatus comprises means for preparing a document to be sent, means for preparing an image to be sent, means for setting whether or not the image is to be displayed as a background image for the document on the display of a receiving-side communication apparatus receiving the document and means for sending, as one set of data, the document, the image and information capable of distinguishing that the image is to be displayed as a background image in a case in which the setting means sets display as a background image, and wherein the second data communication apparatus comprises means for receiving data, display control means for displaying the image as a background image for the document in a case in which data received by the receiving means includes a document, an image and information that can distinguish that an instruction is given to display the image as a background image for the document.

A fourth aspect of the present invention for achieving the above-noted object is a data communication method whereby a document and an image are sent from a first data communication apparatus to a second communication apparatus and the image is displayed on a display of the second data communication apparatus as a background image for the document, and which having a step in the first data communication apparatus of preparing a document to be sent and an image to be used as a background image for the document, a step in the first data communication apparatus of sending the document, the image and information that indicates the display of the image as a background image for the document, a step in the second data communication apparatus of receiving data sent from the first data communication apparatus, and a step in the second data communication apparatus of displaying the image as the background image for the document in a case in which the received data included the document, the image and the indicating information.

BRIEF DESCRIPTION OF THE DRAWINGS

FIG. 6 is a conceptual representation of the configuration of a mail data storage area 292.

FIG. 17 is a conceptual representation of the configuration of a mail data storage area 292 within the RAM 29.

FIG. 21 is a conceptual representation of the configuration of the memory areas of the RAM 29 of a cell phone in the third embodiment of the present invention.

DESCRIPTION OF THE PREFERRED EMBODIMENTS

Embodiments of the present invention are described below in detail, with references made to relevant accompanying drawings.

Figure 1:
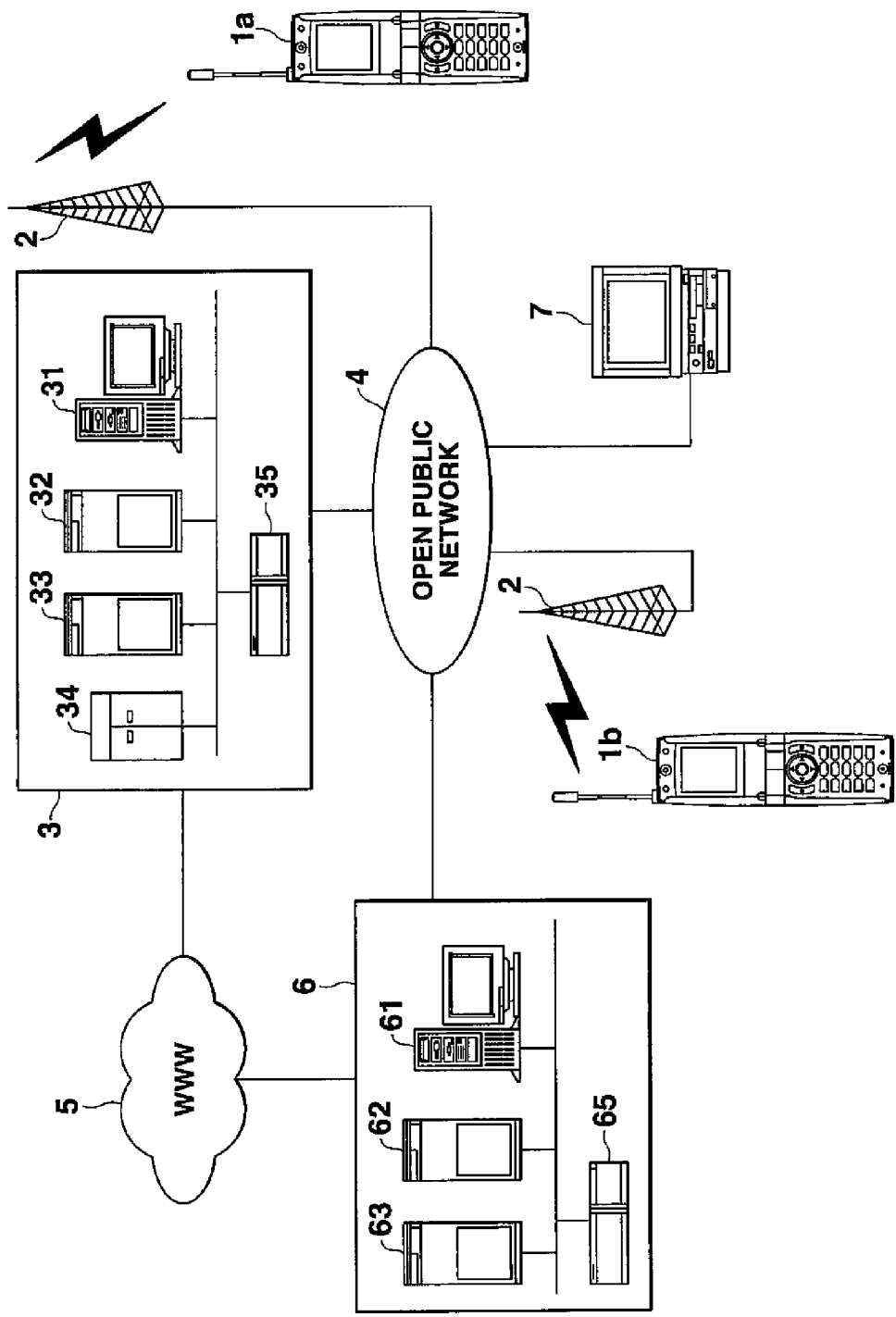
FIG. 1 is a block diagram showing the configuration of a mail sending/receiving system according to a first embodiment of the present invention.

FIG. 1 is a block diagram showing the configuration of a mail sending/receiving system according to the first embodiment of the present invention. In this drawing, cell phones (wireless communication terminals/data communication apparatuses) 1a and 1b have photographing apparatuses and image memories capable of storing a plurality of images (photographs) photographed by the photographing apparatuses, in addition to a function of sending a mail to which is attached an image (photograph) stored in the image memory, and a function of receiving a mail to which an image is attached. The cell phones 1a and 1b also have functions such as a function of displaying an image attached to an e-mail or displaying an embodiment with an image attached thereto as a background, and a function of sending an e-mail that includes information that instructs a receiving-side terminal (receiving-side cell phone) to display an attached image as the background image of the mail text. Thus, the cell phones 1a and 1b not only have the conventional function of being able to send and receive images as attached files, but also a mail function that enables the sending and receiving of e-mail with having a background image that is the attached image file displayed as the background. Additionally, the cell phones 1a and 1b have a function of correcting or adjusting the brightness of the background image.

The cell phones 1a and 1b, before sending an e-mail having a background image, for example, can correct the brightness of the image attached to the e-mail as a background image, so that when the image is displayed as a background image overlaid with the body text of the e-mail, the body text is displayed clearly. Stated in different terms, when an e-mail having a background image is received at the receiving side, with the attached file as a background, the body text of the e-mail is displayed overlaid on the image.

The wireless base stations 2, via the open public network 4 (more precisely, a cellular phone network provided by a communications service provider to the users of the cell phones 1a and 1b and having the open public network as part of its configuration), make connection with a center apparatus (including an Internet provider) of the communication service provider.

The center apparatus (including an Internet provider) 3 of the communication service provider has, in addition to an exchange, which is necessary for the cell phone service provided as a main service, a system for connection to WWW5, which is described later (Web server 32 and router 35), and a mail system (mail server 33). The wireless station 2 has a function for connecting the cell phones 1a and 1b to the WWW5 as an access point.

The open public network 4 includes a cell phone network of another communication service provider, and analog or digital telephone networks. WWW5 is the so-called Internet.

An Internet service provider (hereinafter abbreviated to ISP) 6, with the exception of the exchange, has the same configuration as the center apparatus 3 of the communication service provider, and has a system for connection to WWW5 (referred to herein as Web server 62 and router 65 as a convenience), and a mail system (mail server 63). A personal computer 7 makes connection to WWW5 via a open public circuit 4 and the ISP 6.

In an embodiment of the present invention, the cell phones 1a and 1b have a mail function of sending and receiving mail having a background image, that is, a mail software program for performing display processing to display an image attached to an e-mail as a background image to the body text of the e-mail, an the case in which an e-mail having a background image is sent and received between the cell phones 1a and 1b, the cell phone that receives the e-mail having the background image attached thereto displays the image in the background, and displays the body text of the associated e-mail laid thereover (details described below). In the case of a communication apparatus having only the conventional mail function of the functions of the cell phones 1a and 1b, for example in the case in which an e-mail with a background image is sent to the personal computer 7, at the personal computer 7 the image attached to the received e-mail as the background image is treated as the usual attached file. Thus, the "mail software program for performing processing of an e-mail with a background image" has compatibility with a generally known mail software program.

Figure 2A:
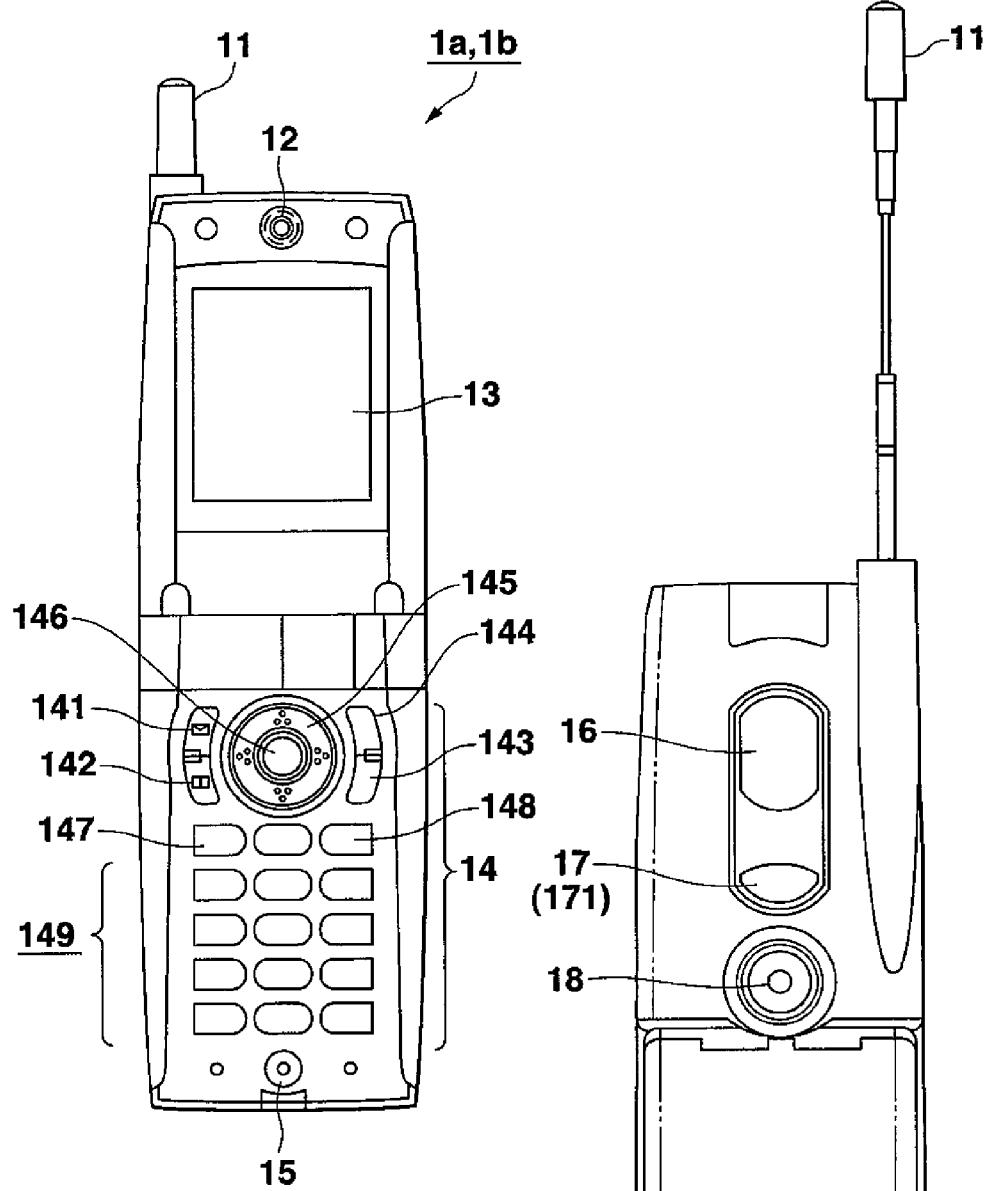
FIG. 2A and FIG. 2B show a cell phone 1a, 1b in the opened condition, FIG. 2A showing the front of the cell phone 1a and 1b and FIG. 2B showing the rear of the cell phone 1a, 1b.
Figure 2B:
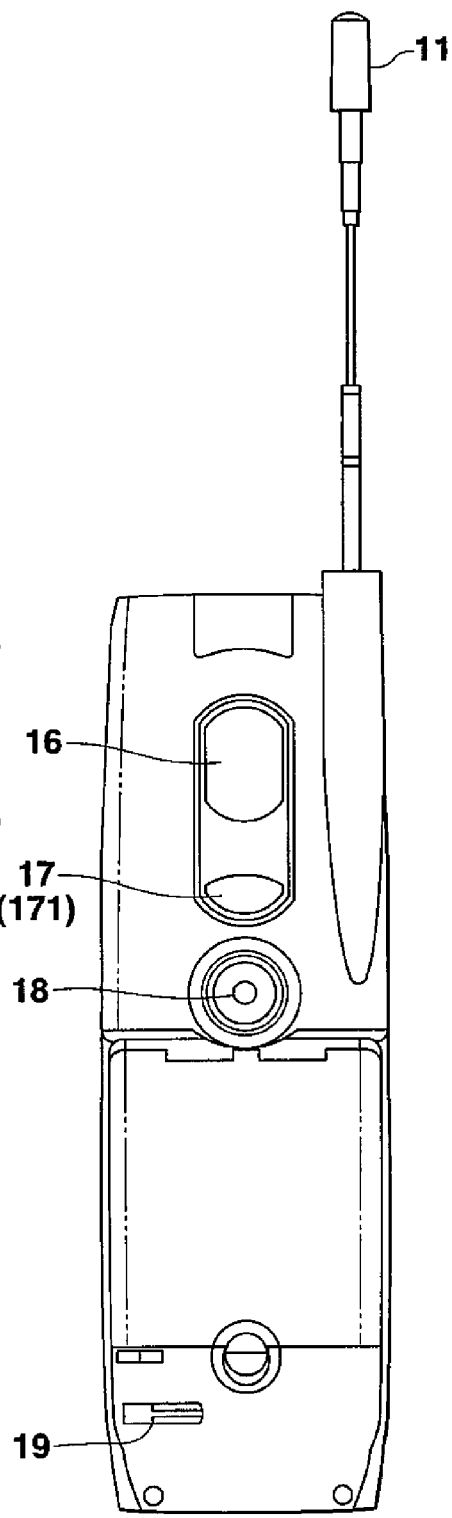

FIG. 2A and FIG. 2B show outer views of the cell phones 1a and 1b. The cell phones 1a and 1b in this embodiment of the present invention have a folding construction formed by a cover part and a main part, FIG. 2A showing the front view of the cell phones 1a and 1b and FIG. 2B showing the rear view of the cell phones 1a and 1b, both in the opened condition. An antenna 11 is provided at the rear of the cover part and is freely extendible and retractable. A speaker 12 is provided at the rear surface of the cover part, and provides audio output. A display (main display) 13 is a color LCD (liquid-crystal display) having a dot configuration of 120 dots (width) by 160 dots (height). The main display 13 is capable of simultaneously displaying the image (photograph) an the body text of an e-mail having an image (background image). A key operation section 14 is formed by such parts as a mail key 141, an address key 142, a camera key 143, a sub-menu key 144, a cross key (four-direction cursor key) 145, a center key (entry key) 146, an off-hook key 147, an on-hook key 148, and a numerical keys 149. The mail key 141 launches a mail function, and is used to display a mail menu. The address key 142 is used to open an address book when selecting the mail address of another party or selecting a telephone number to be called. The camera key 143 launches a camera function, and is used to display a camera menu. This camera key 143 functions as a display switching function, which, when in the mail creation mode or in the mail display mode when a mail body text is displayed overlaid onto a background image, selects display of the mail text only or the background image only. The sub-menu key 144 is used to display sub-menus for various functions. The cross key 145 is used to select a desired item from menus displayed for various functions, and for shifting the inputting position when making data input using the numerical keys 149. The center key (entry key) 146 is used to establish or select menu items selected by operation of the cross key 145. The off-hook key 147 is used to start a call, and the on-hook key 148 is used to end a call. The numerical keys 149 are used when inputting a telephone number or characters.

A key operation section 14 is formed by such parts as a mail key 141, an address key 142, a camera key 143, a sub-menu key 144, a cross key (four-direction cursor key) 145, a center key (entry key) 146, an off-hook key 147, an on-hook key 148, and a numerical keys 149. The mail key 141 launches a mail function, and is used to display a mail menu. The address key 142 is used to open an address book when selecting the mail address of another party or selecting a telephone number to be called. The camera key 143 launches a camera function, and is used to display a camera menu. This camera key 143 functions as a display switching function, which, when in the mail creation mode or in the mail display mode when a mail body text is displayed overlaid onto a background image, selects display of the mail text only or the background image only. The sub-menu key 144 is used to display sub-menus for various functions. The cross key 145 is used to select a desired item from menus displayed for various functions, and for shifting the inputting position when making data input using the numerical keys 149. The center key (entry key) 146 is used to establish or select menu items selected by operation of the cross key 145. The off-hook key 147 is used to start a call, and the on-hook key 148 is used to end a call. The numerical keys 149 are used when inputting a telephone number or characters.

A microphone 15 is provided at the bottom part of the main part, and is used for voice input.

A sub-display 16 is provided at the rear panel of the cover part. The rear panel key 17 is made of a transparent or translucent material, and has a built-in LED 171 that lights when a call is received. A photographic lens 18 is provided on the rear surface of the cover part 2, below the sub-display 16. A notification speaker 19 is provided to make notification of a received call or the like, and is disposed on the rear surface of the main part, so that it is possible to hear a notification sound even when the cover is closed onto the main part.

Figure 3:
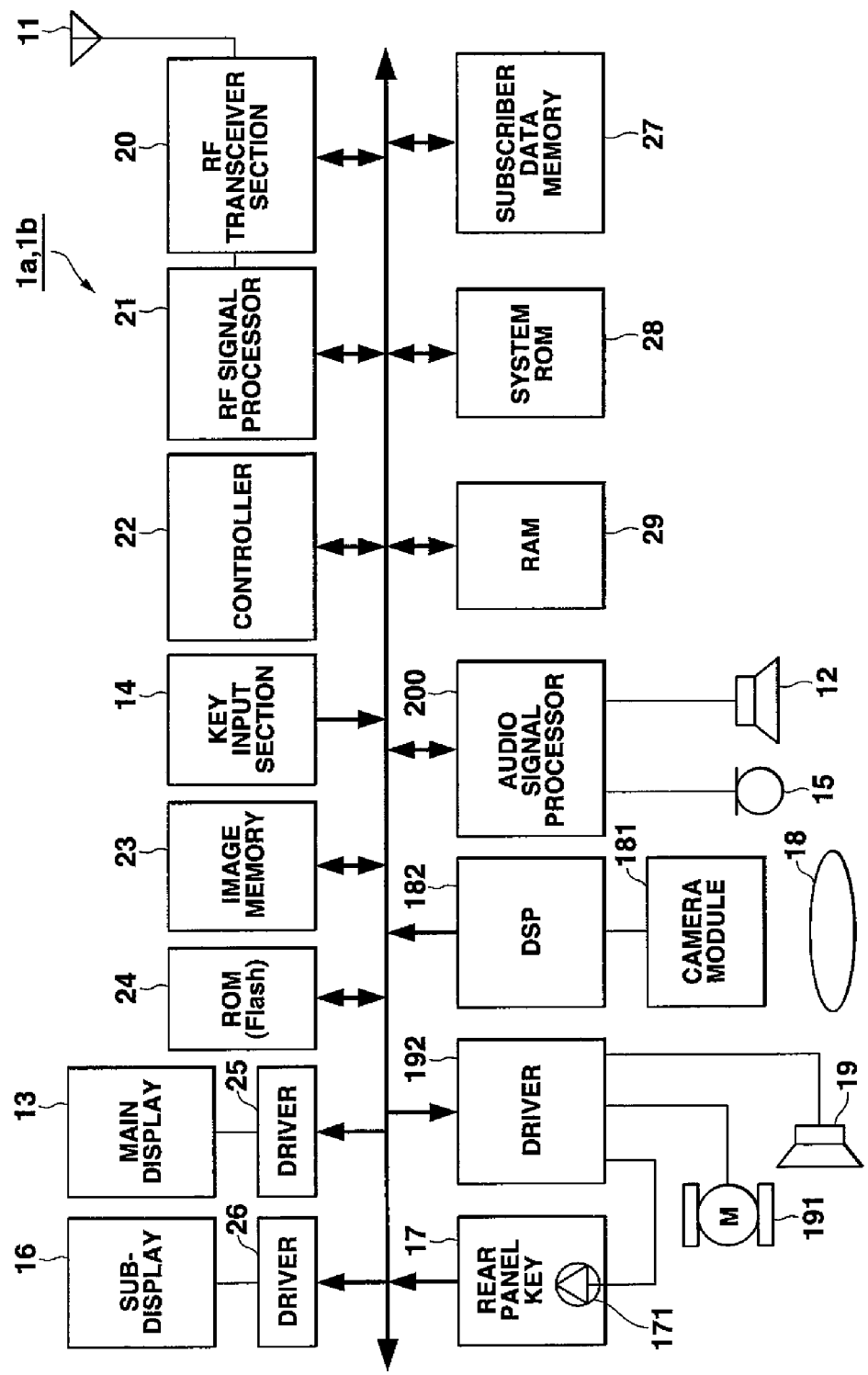
FIG. 3 is a block diagram showing the circuit configuration of the cell phone 1a, 1b.

FIG. 3 is a block diagram showing the circuit configuration of the cell phones 1a and 1b. An RF transceiver section 20 sends and receives voice and data (mail data) via the antenna 11. The RF signal processor 21 performs RF signal processing necessary to demodulate the voice and data (mail data) received by the RF transceiver section 20, or modulate voice or data that is to be sent to the RF transceiver section 20. A controller 22 controls various operations and overall operation.

An image memory 23 is a memory for storing a compressed encrypted file made by a program stored in the image processing program area 2413 that processes an image obtained by the camera module 181 and the DSP 182, and image files downloaded via the WWW5. A ROM 24 is configured as a flash ROM, and is used to store various programs that are features of the present invention.

A driver 25 drives the main display 13. A driver 26 drives the sub-display 16. A subscriber data memory 27 stores a telephone number for calling the cell phone 1, ID and the like of operators (subscribers), and profile data. A ROM 28 stores various programs and the like that control the controller 22. A RAM 29 stores various data required for operation as a wireless communication terminal, as well as data required for operation of the controller 25 and mail data.

An audio signal processor 200 performs encoding of an audio signal input from the microphone 15 and outputting thereof to the RF signal processor 21, as well as decoding of a voice signal from the other party input from the RF signal processor 21 and drive of the speaker 21 so as to make an audio output. The camera module 181 is formed by a CCD or a CMOS device, and captures a color image. The DSP 182 performs encoding of an image captured by the camera module 181. The notification driver 192 is a driver for driving the notification speaker 19, a vibrator 191, and an LED 171.

Figure 4:
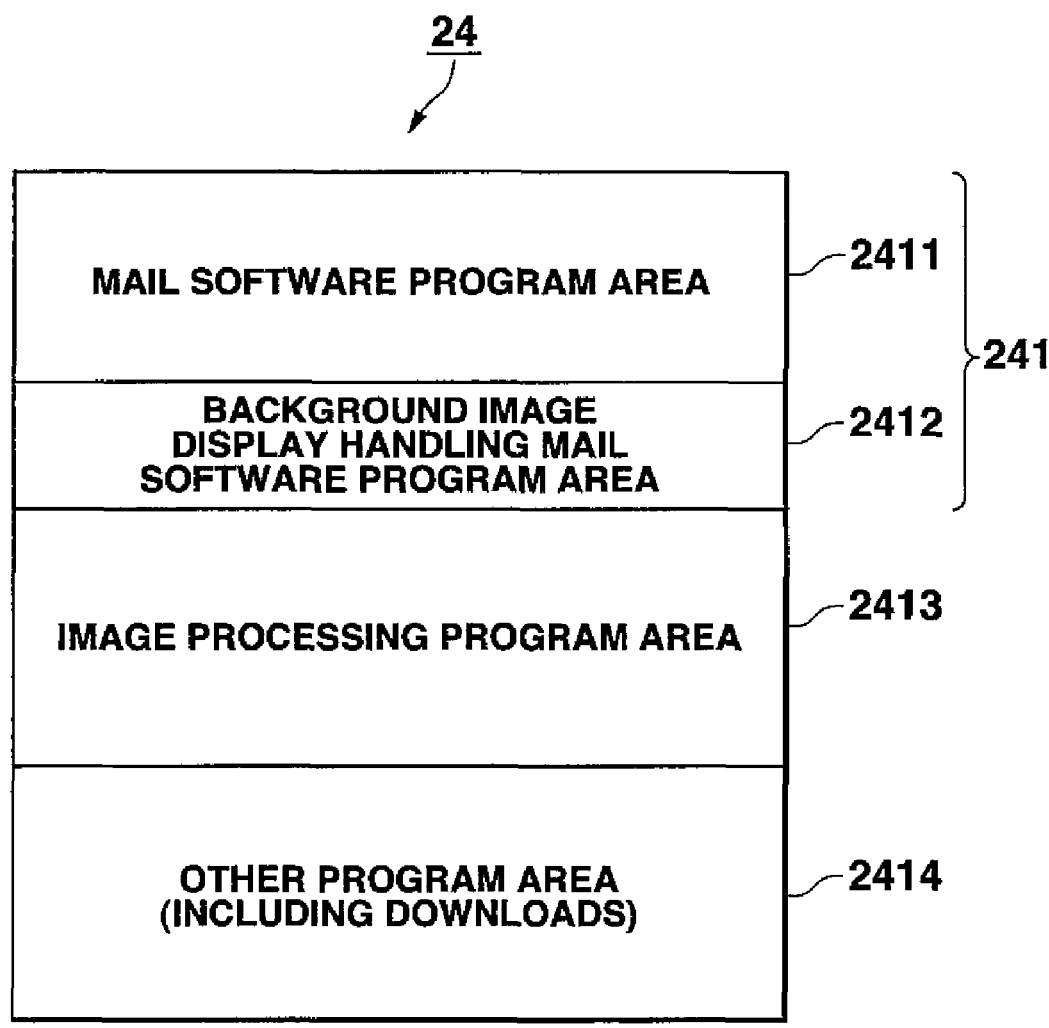
FIG. 4 is a conceptual representation of the configuration of the memory areas of a ROM 24.

FIG. 4 is a conceptual representation of the configuration of the memory areas of the ROM 24. The ROM 24 stores software programs that are a feature of this embodiment of the present invention. The ROM 24 is formed by a mail software program area 241, an image processing program area 2413, and an other program area 2414.

The mail software program area 241 is separated into a mail software program area, into which is stored a known general mail software program, and a background image display handling mail software program area 2412 having a program that performs display processing of an image to be attached to a mail or an image attached to a mail as a background image. The background image display handling mail software program can be downloaded from WWW5 via the ISP 6.

The image processing program area has stored in it an image processing program for compression processing of a digitally encoded image according to the JPEG standard, the PNG standard, or the GIF standard. In the first embodiment, this image processing program distinguishes the average brightness of the overall image and performs processing so as to increase or decrease the brightness. The other program area 2414 has stored in it application programs other than the above.

Figure 5:
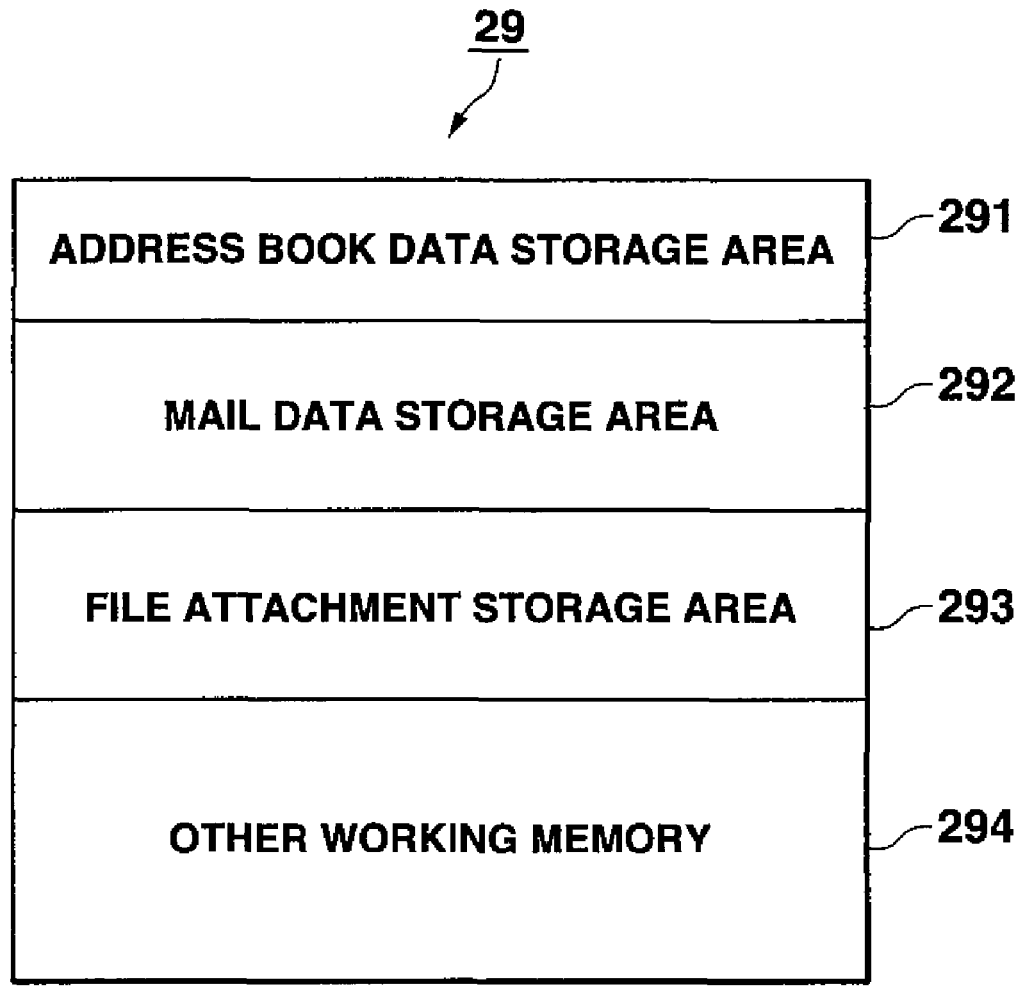
FIG. 5 is a conceptual representation of the configuration of the memory areas of a RAM 29.

FIG. 5 is a conceptual representation of the configuration of the memory areas of the RAM 29. The RAM 29 is separated into an address book data storage area 291, a mail data storage area 292, a file attachment storage area 293, and an other working memory 294. The address book data storage area is used to store names, telephone numbers, e-mail addresses and the like as grouped records. The mail data storage area 292 stores mail data created by mail software, sent mail data, and received mail data. The file attachment storage area 293 stores file attachments when they are attached to files. The other working memory 294 is used as an additional working memory to store various data.

FIG. 6 is a conceptual representation of the configuration of the mail data storage area 292. The mail data storage area 292 is separated into a working area 2921 into which is stored mail data currently being worked on, an area 2922 that stores a plurality of already sent e-mails or e-mails to be sent (send folder), and an area 2923 that stores a plurality of received mail data. The working area 2921 for storing mail data being worked on has areas for storing such things as data representing mail destinations (mail address or the like), mail subjects, mail body texts, addresses (file attachment addresses) indicating at what address in the file attachment storage area 293 or in another file storage area a file attachment is stored when a file is attached to an e-mail, and identification information (such as a mail type identification flag MTF) that indicates whether an e-mail is a conventional type or a type with a background image. The send folder 2922 has areas for storing such things as destinations, subjects, mail texts, file attachment addresses, mail type flags MTF, date and time mail was sent, and identification information indicating whether or not the mail has already been sent (mail sent flag MSF). The receive folder 2923 has areas for storing such things as data indicating the sending (mail addresses and the like), subjects, mail texts, file attachment addresses, mail type identification flags MTF, date and time mail was received, and identification information indicating whether or not the mail has already been verified as received (mail read flag MRF).

The operation of the first embodiment of the present invention is described below, taking first the processing performed to create an e-mail.

Figure 7:
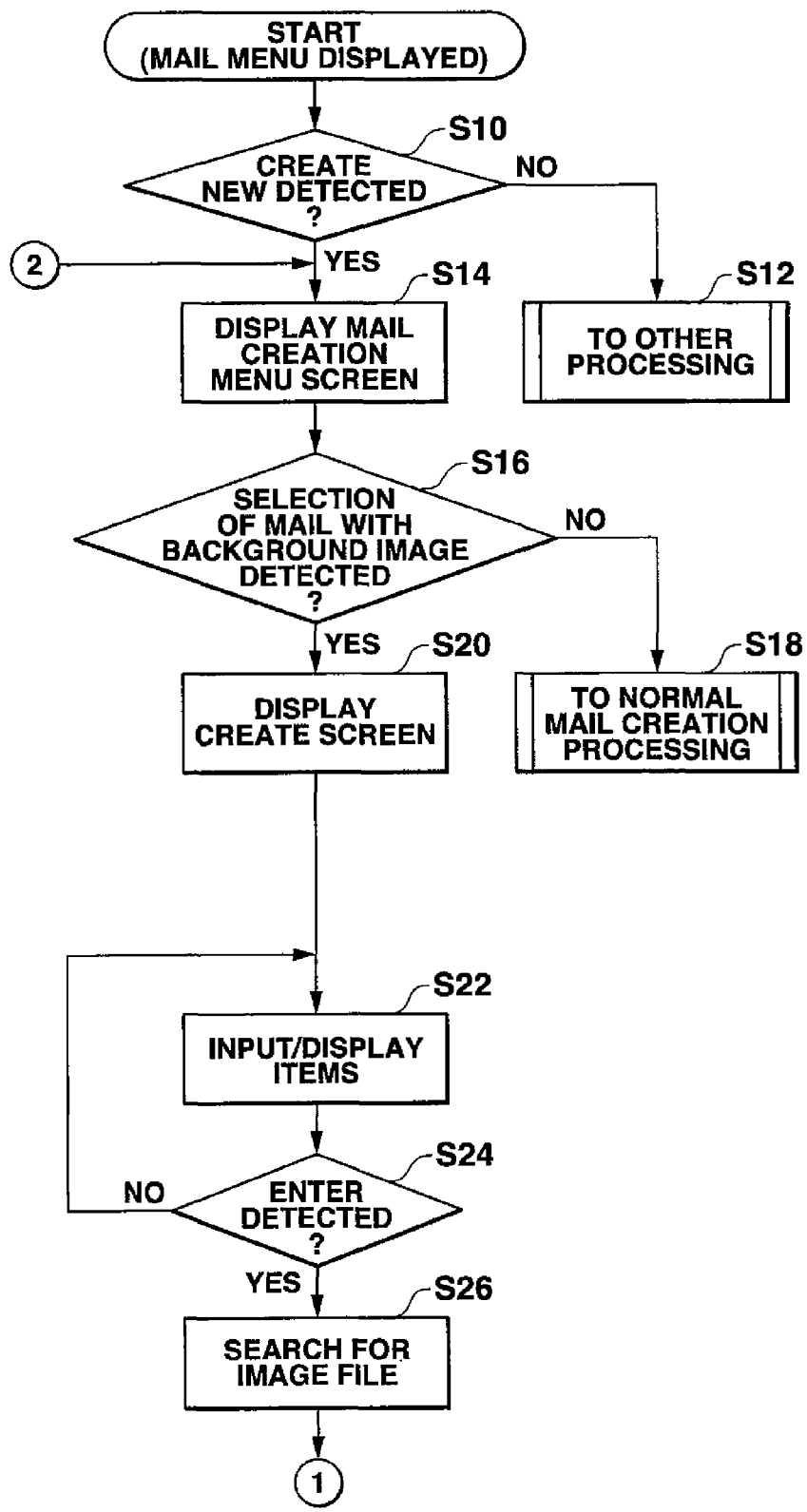
FIG. 7 through FIG. 9 are collectively a flowchart illustrating the mail creation processing in the first embodiment of the present invention.
Figure 8:
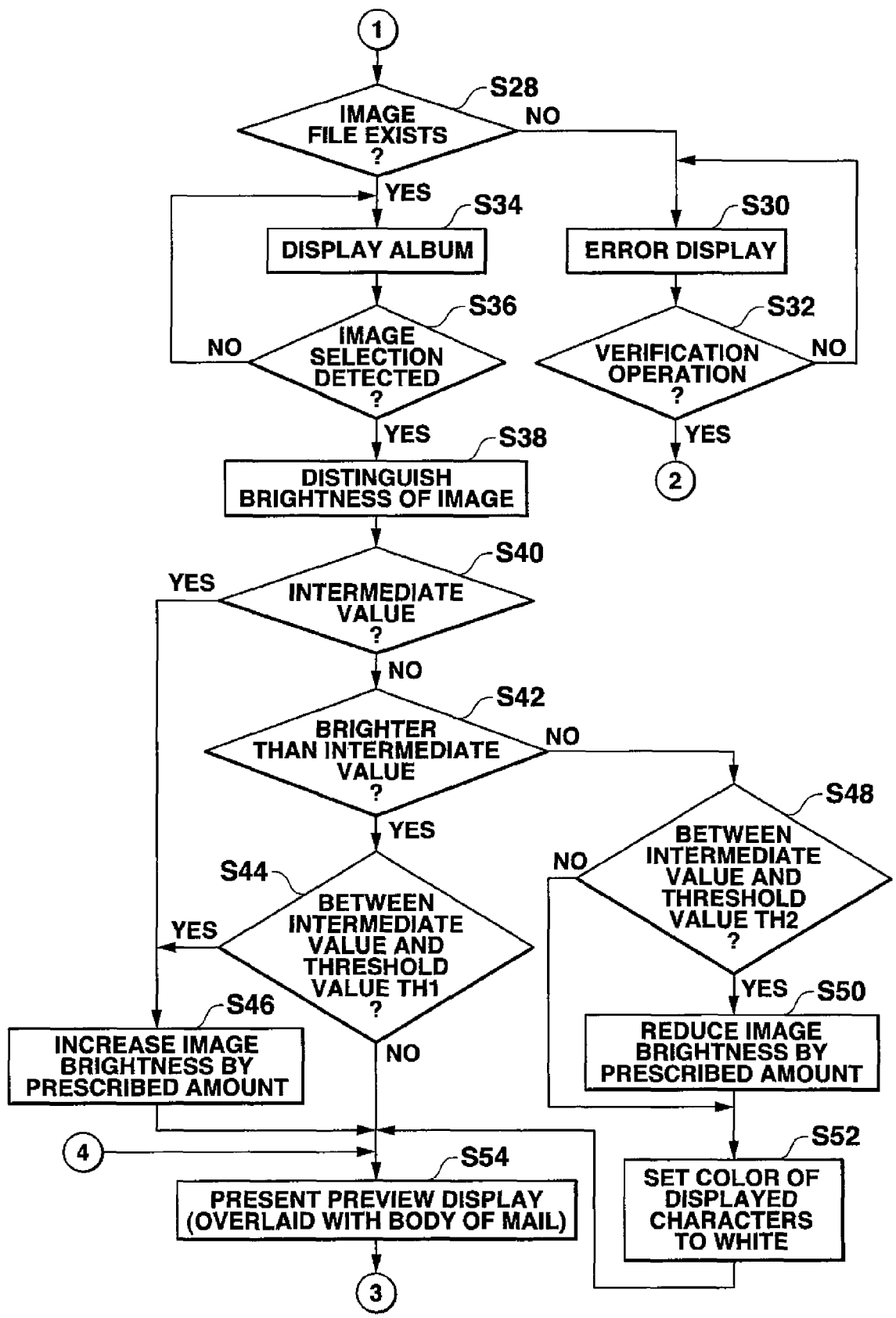
Figure 9:
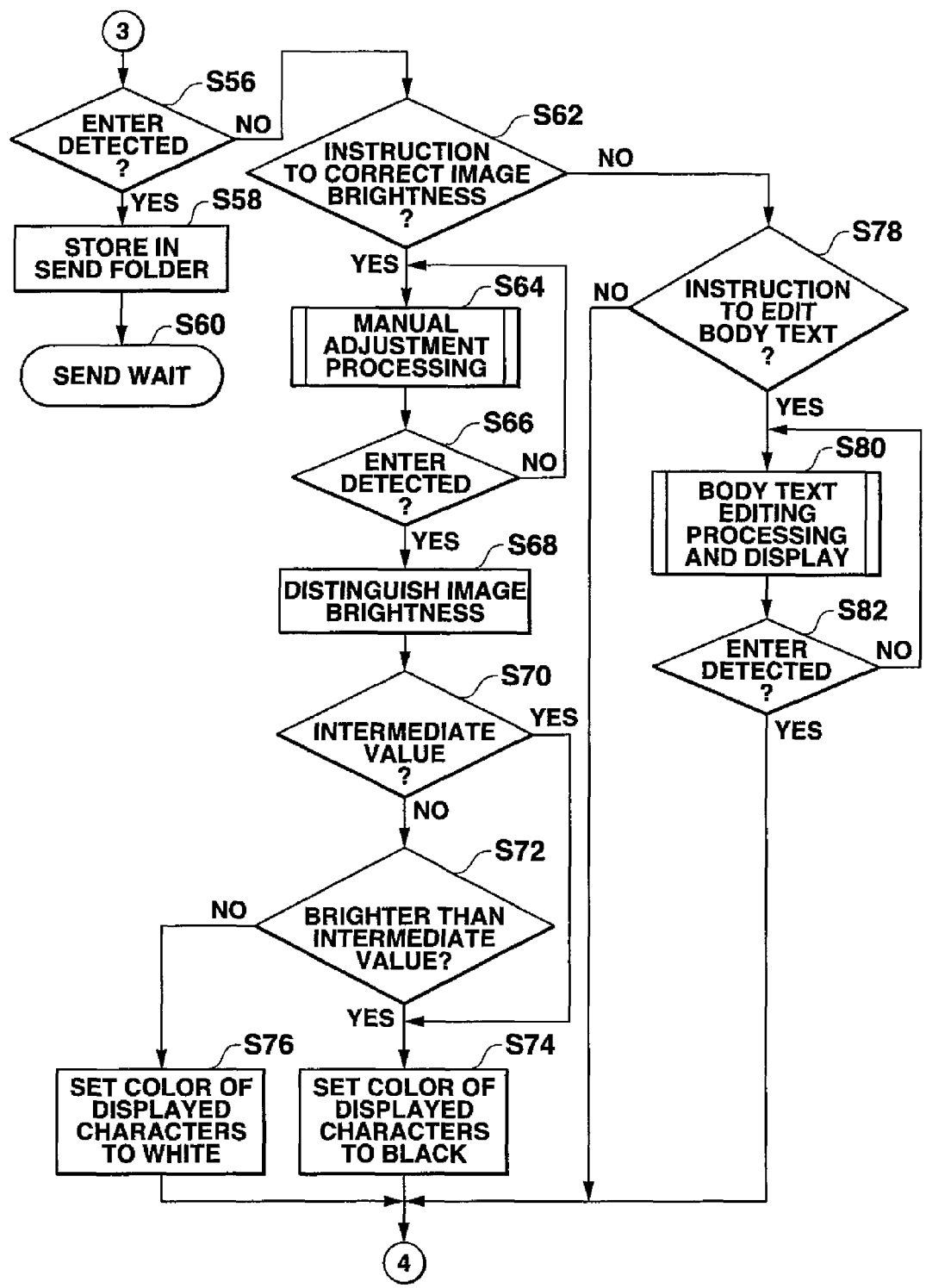

FIG. 7 through FIG. 9 present a flowchart illustrating the mail creation processing in the first embodiment. If the mail key 141 is pressed from the waiting condition, the mail mode is launched, and the mail menu items "Create New", "Receive Folder", "Send Folder", and the like appear on the main display 13. The "Create New" item is a menu item selected to create a new e-mail, the "Receive Folder" item is a menu item selected to check received mail, and the "Send Folder" item is a menu item selected to check already sent mail and mail that has not yet been sent. The flowchart starting in FIG. 7 starts from the condition in which the mail menu is being displayed.

First, a judgment is made as to whether or not an instruction has been given from the mail menu to create a new e-mail (step S10). In the case in which there was no instruction to create a new e-mail, the flow transitions to other processing (step S12). If there was an instruction to create a new e-mail, however, a menu screen for creating an e-mail is displayed (step S14). This menu screen is used to select either creation of an e-mail using the conventional mail software program or creation of an e-mail using the background image display handling mail software program. Next, a judgment is made as to whether or not selection has been made to create e-mail with a background image (step S16). If creation of an e-mail with a background image is not selected, flow proceeds to the conventional e-mail creation processing (step S18).

If creation of an e-mail with a background image is selected, however, information indicating mail with a background image is set into the mail type flag MTF by setting the flag, an the mail creation screen is displayed on the display 13 (step S20). From this creation screen, items essential to creating an e-mail, these being destination, subject and body text and the like, are displayed. Net, when each of the items is selected and corresponding data is input, the data for each of the input items is stored into corresponding item areas in the working area 2921, and the input data for each of the items is displayed on the display 13 (step S22). Next, a judgment is made as to whether an enter (verify) operation has been made for the input data (step S24). If an entry operation had not been made, return is made to step S22, and input is continued.

If an entry (verification) operation had been made, however, a search is made of whether there is an image file stored in the image memory 23 that can be attached to the e-mail (step S26). A check is also made as to whether or not an image file is stored (step S28). In the case in which there is no image file stored, this is indicated to the user by an error display (step S30). This error display is continued until the user makes a verifying operation, for example by pressing any key, and when a key operation is detected at step S32, return is made to step S14.

If there was an image file, an album of all the image files is displayed (step S34). A judgment is then made to determined whether or not a file to be attached has been selected (step S36), and if a file has not been selected, return is made to step S34, the album display continuing. The selection of an image file to be attached, that is, the image to be used as the background image for a mail text, is performed by the user, who uses the cross (cursor) key 145 an the center key 146.

If a file to be attached to an e-mail has been selected from the album display, the address indicating the location in which the selected image file is stored is stored into the file attachment address storage area of the working area 2921, and the brightness of the image is judged based on the selected image file (step S38). A judgment is then made as to whether or not the brightness of the image is an intermediate value M (step S40). If the brightness of the image is the intermediate value M, brightness of the image is increased by a prescribed amount (step S46), after which the image is displayed overlaid over the body text created at step S22 (step S54). That is, a preview display is presented of the condition in which the display of the e-mail will be viewed at the receiving-side cell phone.

If the brightness of the image was not the intermediate value M, a judgment is made as to whether or not the image is brighter than the intermediate value M (step S42). If the image is brighter than the intermediate value M, a further judgment is made as to whether or not the image brightness is between the intermediate value M and the threshold value TH1 (where intermediate value M<threshold value TH1) (step S44). If the brightness of the image is between the intermediate value M and the threshold value TH1, after increasing the brightness of the image by a prescribed amount at step S46, flow proceeds to step S54, at which a preview display is made of the body text of the e-mail created at step S22 with this image overlaid thereover. If the brightness of the image is greater than threshold value TH1, however, rather than adjusting the brightness of the image flow proceeds as is to step S54, at which a preview display is made of the body text of the e-mail created at step S22 with this image overlaid thereover.

If the brightness of the image is darker than the intermediate value M, however, a judgment is made as to whether or not the image brightness is between the intermediate value M and the threshold value TH2 (where intermediate value M>threshold value TH2) (step S48). If the brightness of the image is between the intermediate value M and the threshold value TH2, the brightness of the image is decreased by a prescribed amount (step S50) and the color of displayed characters (in the e-mail text) is set to white (step S52). After this, a preview display is made of the body text of the e-mail created at step S22 with this image overlaid thereover (step S54). In the case in which the brightness of the image is darker than the intermediate value TH2, without adjusting the brightness of the image, the color of the displayed characters (in the e-mail text) is set to white (step S52), after which a preview display is made of the body text of the e-mail created at step S22 with this image overlaid thereover (step S54).

As described above, at the preview display made at step S54, after adjusting the brightness of the image that will be attached to the e-mail to the sent, the mail body text is displayed with an overlay of this image on the display 13.

Figure 10:
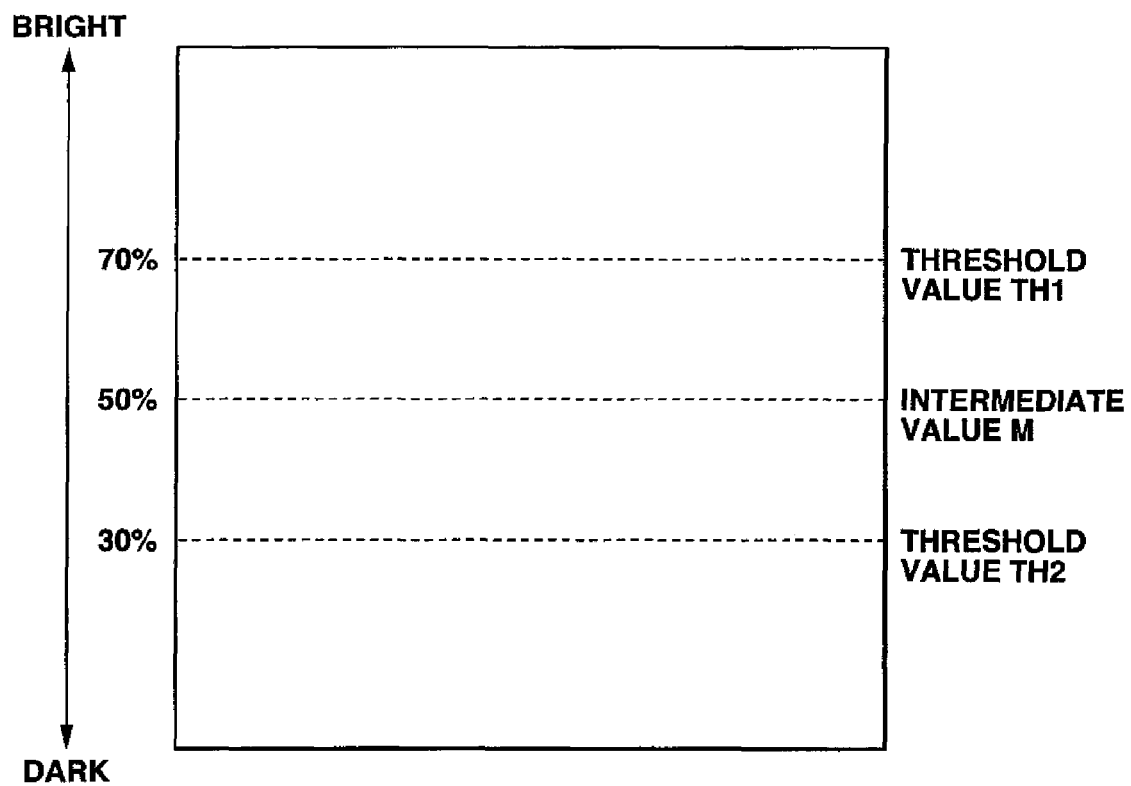
FIG. 10 is a conceptual representation of the image brightness, illustrating adjustment of the brightness of the image.
Figure 11A:
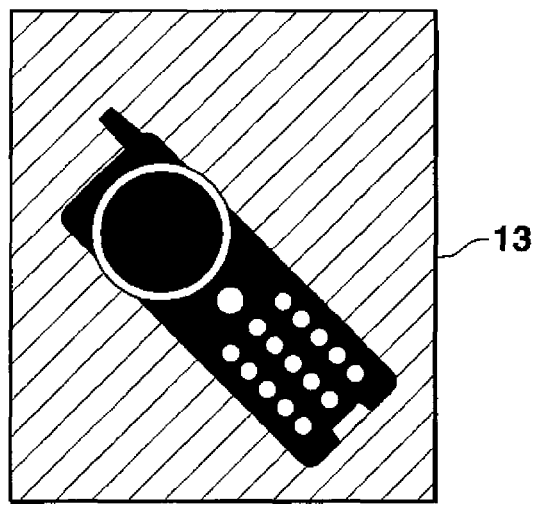
FIG. 11A shows an original image.
Figure 11B:
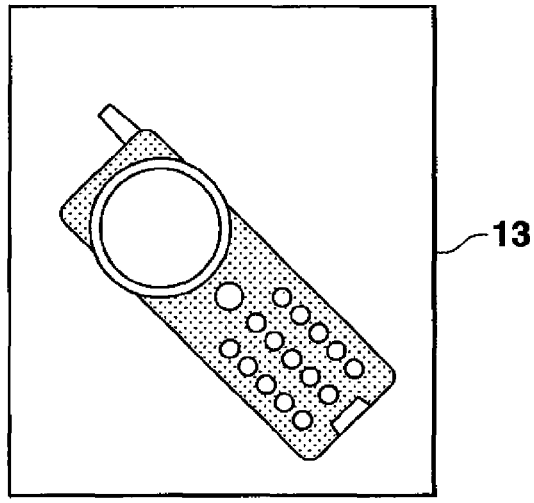
FIG. 11B shows an image with the image brightness of the intermediate value M or a brightness between the intermediate value M and the threshold value TH1 (70% brightness) after the adjustment of the brightness of the image.
Figure 11C:
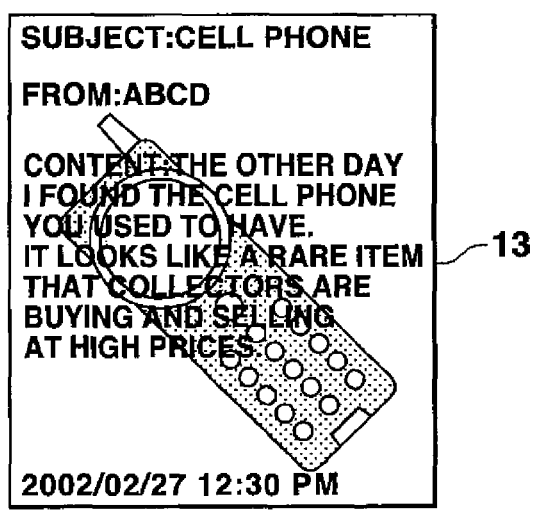
FIG. 11C shows an example of a display with the adjusted-brightness image overlaid by a mail text.

In the first embodiment of the present invention, by judging the brightness of the image (which is to be attached to e-mail as a background image) in this manner, the brightness of the image to be displayed as a background for the e-mail is adjusted. FIG. 10 is a conceptual representation showing the image brightness for the purpose of illustrating the image brightness adjustment. FIG. 11A to FIG. 11C show a schematic representation of an image with the image brightness of the intermediate value M a brightness between the intermediate value M and the threshold value TH1 (70% brightness) after the adjustment of the brightness of the image, and an example of a display with the adjusted-brightness image overlaid by a mail text.

When the brightness of the image is the intermediate value M or between the intermediate value M and the threshold value TH1 (70% brightness) indicated in FIG. 10, processing is performed so as to increase the brightness (refer to the above-described step S46). FIG. 11A shows the original image, and FIG. 11B shows the processed image. The e-mail body text created at step S22 is laid over the image of FIG. 11B to create the preview display shown in FIG. 11C (refer to the above-described step S54).

Figure 12A:
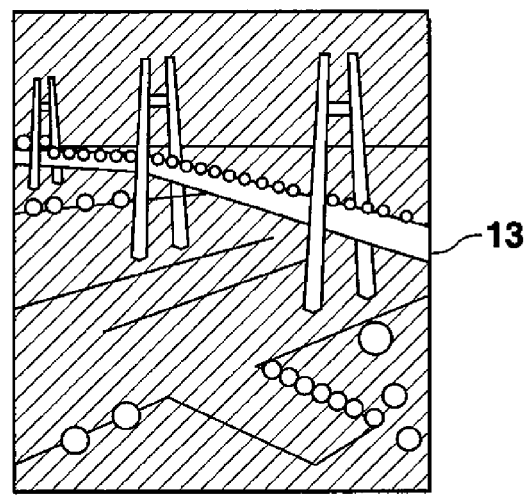
FIG. 12A shows an original image.
Figure 12B:
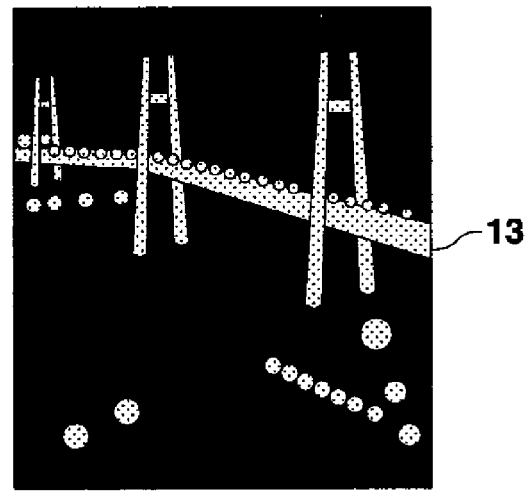
FIG. 12B shows an image with the image brightness of the intermediate value M or a brightness between the intermediate value M and the threshold value TH2 (30% brightness) after the adjustment of the brightness of the image.
Figure 12C:
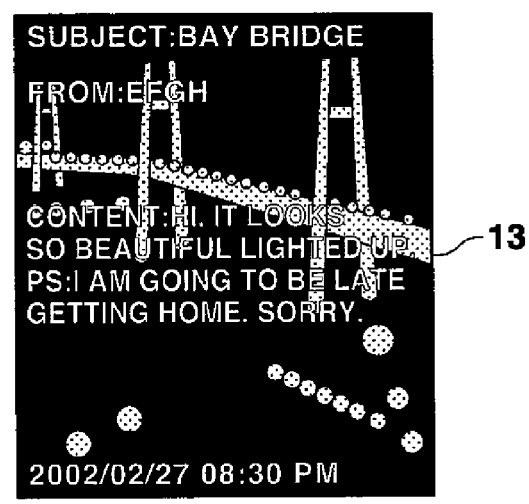
FIG. 12C shows an example of a display with the adjusted-brightness image overlaid by a mail text.

If the brightness of the image is less than the intermediate value M shown in FIG. 10 and between the intermediate value M and the threshold value TH2 (30% brightness), processing is performed so as to decrease the brightness of the image (refer to the above-described step S50). FIG. 12A to FIG. 12C show a schematic representation showing the original image, an image resulting from adjusting the brightness of an image having a brightness less than the intermediate value M and between the intermediate value M and the threshold value TH2 (30% brightness), and the brightness-adjusted image with the e-mail laid thereover. FIG. 12A shows the original image, and FIG. 12B shows the processed image. The e-mail body text created at step S22 is laid over the image of FIG. 12B to create the preview display shown in FIG. 12C (refer to the above-described step S54).

In the case in which the user is satisfied with the preview display made at step S54, the user makes the entry (verification) operation (performs an operation which finalizes the content of the mail), but if the user is not satisfied with the preview display, the user can give an instruction to manually adjust the brightness of the image, or give instructions to change the locations of line breaks in the mail text or display position of the mail text.

Therefore, the controller 22 next makes a judgment as to whether or not a user-made entry operation has been detected (step S56). If a user-made entry operation has been detected, the created mail data is stored in the send folder of the mail data storage area 292 (step S58), after which a send instruction is given or a transition is made the send wait condition (step S60).

In this embodiment, the processed image is stored in association with the mail text in the file attachment storage area 293. Therefore, at the storage processing of step S58, of the mail data being currently worked on stored in the working area 2921, data other than the file attachment addresses, that is, destinations, subjects, mail body texts, and mail type flags (contents of the identification MTF flags) is stored in areas corresponding to the send folder 2922. In the file attachment address storage area of the send folder 2922 are stored addresses in the file attachment storage area 293 in which processed files are stored. The MTF identification flags in the send folder 2922 are set to the condition that indicates unsent mail ("0").

Mail data stored in the send folder 2922 (subjects and mail texts), when in the waiting condition of step S60 or thereafter when an instruction is given to send mail and this mail data is read out from the send folder, is sent to the specified destination along with an image specified by the file attachment address and the mail type flag MTF. When this is done, the time sent is stored in the sent date and time storage area of the send folder 2922, and the identification flag MSF is set to the condition indicating the sent condition ("1").

A cell phone having received this e-mail stores the received mail data in an area corresponding to the receive folder 2923, and stores the time of receipt in the date/time received storage area. When this is done, the MRF identification flag in the receive folder 2923 is set to the condition indicating not display (not verified) ("0"). In this case, because the MTF mail type flag of the received mail indicates that the e-mail has an image (background image), when it is read out of the receive folder 2923 and displayed, the image attached to the mail is displayed as a background image, with the mail body text overlaid thereover.

In the case in which at step S56 there was no entry operation detected, the detection is made of whether or not an instruction has been given for a manual adjustment (step S62), as well as detection of whether or not an instruction is given to correct the mail body text (step S78). If an instruction to make manual adjustment of the brightness of the image is detected, the image brightness is manually adjusted (step S64). A judgment is again made to see whether or not a user-made entry operation has occurred (step S66). If the entry operation has not been made, return is made to step S64, and manual adjustment continues.

If an entry operation has made after manual adjustment, judgment is made of the brightness of the image after adjustment (step S68), and a judgment is made as to whether or not the image brightness is the intermediate value M (step S70). In the case in which the image brightness is not the intermediate value M, a further judgment is made as to whether or not the image brightness is greater than the intermediate value M (step S72). If the image brightness after adjustment is greater than the intermediate value M, at step S47 the color of the displayed characters (of the mail text) is set to black, and then return is made to the above-described step S47, at which a preview display is made of the body text overlaid on the image.

In the case in which the brightness of the image after manual adjustment is the intermediate value M, at step S74 the color of displayed characters (of the mail text) is set to black, and then return is made to the above-described step S54, at which a preview display is made of the image with the body text overlaid thereover.

If the image brightness after manual adjustment is darker than the intermediate value M, at step S76 the color of displayed characters of the body text of the mail is set to white, after which return is made to the above-described step S54, at which an overlaid preview display is made of the mail text and the image.

By manual adjustment of the image brightness if the image brightness crosses over the intermediate value M by the change, the color of the characters in the mail text is changed. If the user makes an entry operation (thereby finalizing the content of the mail), as described above mail data undergoing work is stored in the send folder 2922 of the mail data storage area 292 (step S56).

At step S78, in the case in which an instruction to correct (edit) the mail text is detected, keeping the display of the background image unchanged, correction of the position of carriage returns in the mail text or correction of the display position of the mail text, or correction of the mail text itself is performed (step S80). The position of a carriage return in the mail text is corrected, by inserting or deleting a carriage return in the mail text. The display position of the mail text is corrected by inserting a carriage return code or a space code at the head of the mail text. Another detection is made of whether or not the user has made an entry operation (step S82). If the entry operation had not been made, return is made to step S80, and mail text editing continues.

In the case in which, at step S78, there is no detection of an instruction to edit the mail text, and in the case in which, at step S82, an entry operation is detected, return is made to the above-described step S54, at which an overlaid preview display is made of the mail text and the image.

Figure 13:
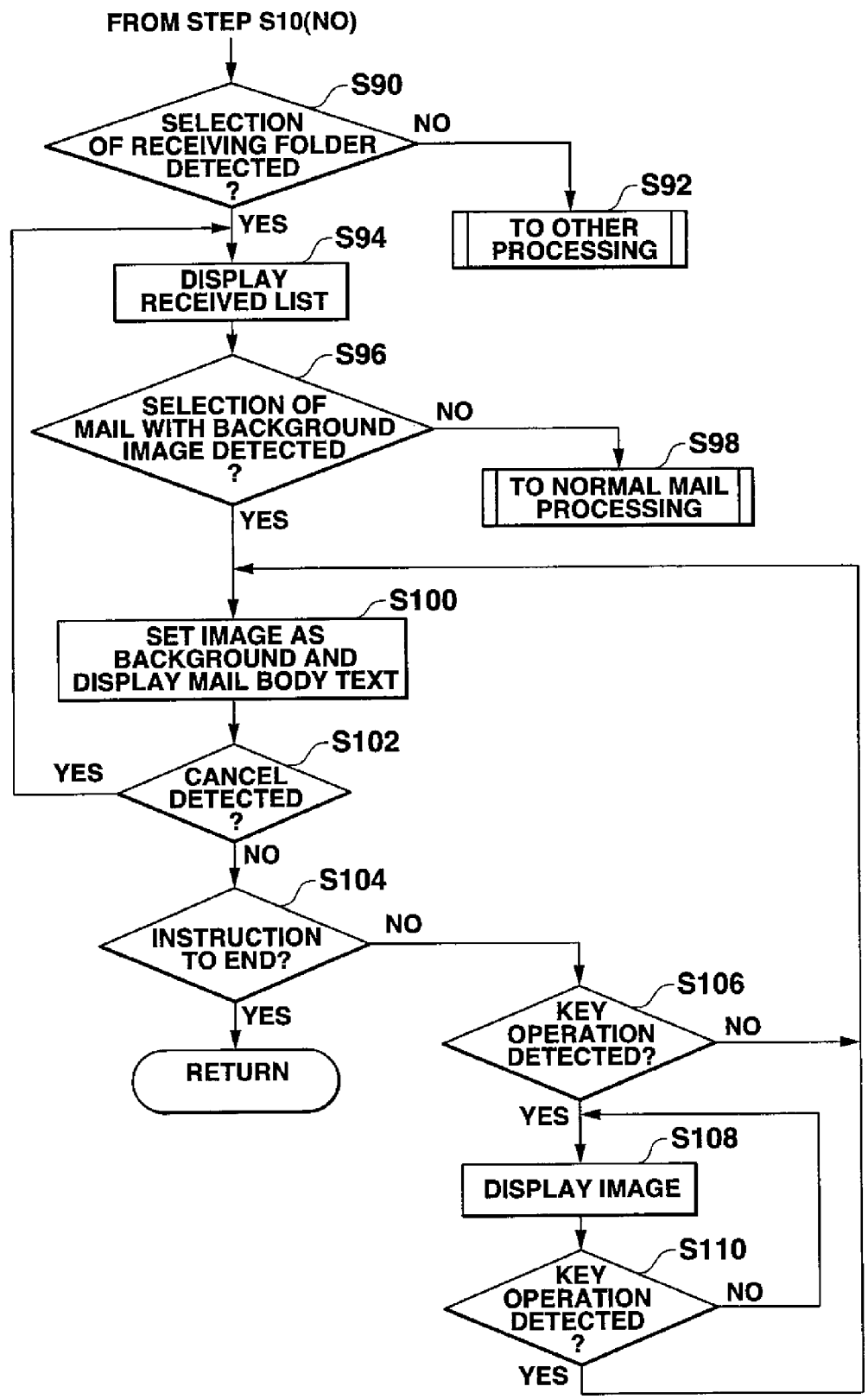
FIG. 13 is a flowchart illustrating the received mail display processing in the first embodiment of the present invention.

FIG. 13 is a flowchart illustrating the received mail display processing in the first embodiment of the present invention. Received mail display processing comes under the category of "other processing" as noted at step S12 in the flowchart of FIG. 7, and the flowchart shown in FIG. 13 is the branch from the "NO" result at step S10 in FIG. 7.

In the case in which a selection is made other than to create a new e-mail, a judgment is made as to whether or not the receive folder is selected (step S90), and if the receive folder is not selected, flow proceeds to other processing (step S92). In the case in which the receive folder is selected, however, the received list is displayed so as to display a list of received e-mail (step S94).

Figure 14:
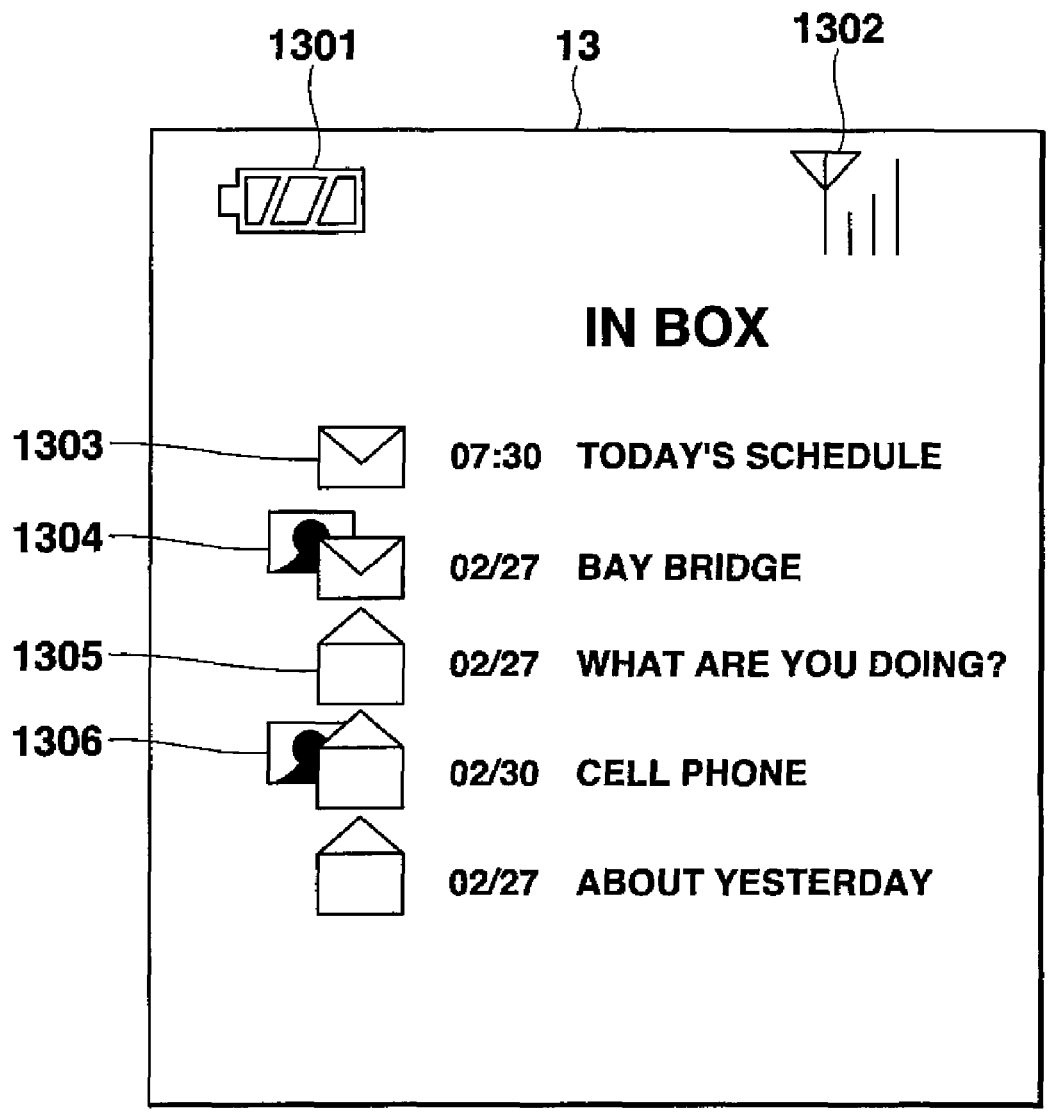
FIG. 14 is a schematic representation showing an example of a display of a received list presented on the display 13.

FIG. 14 is a schematic representation of an example of a received list (In Box) display on the main display 13. The icon 1301 represents the amount of battery charge, and the icon 1302 represents the radio receiving condition. In the received list, the icons 1303 to 1306 provide a view of read/unread statuses of each e-mail. More specifically, the icon 1303 is an icon that is displayed when the identification flag MTF is "0" and also the identification flag MRF is "0", meaning that the e-mail is unread e-mail. The icon 1304 is displayed when the receive folder 2923 identification flag MTF is "1" and also the identification flag MRF is "0", meaning that the e-mail is an unread e-mail with a background image. The icon 1305 is an icon that is displayed when the receive folder 2923 identification flag MTF is "0" and also the identification flag MRF is "1", meaning that the e-mail has been read. The icon 1306 is an icon that is displayed when the receive folder 2923 identification flag MTF is "1" and also the identification flat MRF is "1", meaning that the e-mail is an embodiment with a background image that has already been read.

From this display, the user performs a selection operation to make a selection from the list of an e-mail to be displayed. The controller 22, based on the identification flag MTF (contents) of the selected embodiment, whether or not a mail with a background image has been selected (step S96). If an e-mail with a background image has not been selected, flow proceeds to normal mail processing (step S98).

In the case in which the selected e-mail has a background image, the mail text thereof is displayed with the attached image as the background on the main display 13 (step S100). Next, a judgment is made as to whether or not a cancel operation has be detected (step S102), and if a cancel operation has been detected, return is made to step S94, thereby transitioning to the received list display.

In the case in which a cancel operation has not been detected, a check is made to see whether or not an ending operation has been detected (step S104) and if the ending operation has been detected, return is made to the main menu.

If an ending operation was not detected, a check is made as to whether or not a key 143 operation has been made, which is a judgment as to whether or not a display instruction has been given for a background image (step S106). If a key 143 operation was not made, return is made to step S100, and the display of the image with the superimposed mail text is continued.

In the case in which the key 143 operation was made, the mail text display is gradually removed, until the display is that of only the background image as shown in FIG. 11B (step S108). Next, a check of whether or not the key 143 operation was made is done once again (step S110). In the case in which a key 143 was made, return is made to step S108, and the image display is continued. If a key 143 operation is made while the image is being displayed, however, return is made to step S100, at which the mail text slowly appears in the display, after which the display has the mail text overlaid over the background image.

That is, each time the key 143 operation is made, an alternating switched display is made of the image with the mail text overlaid (refer to FIG. 11C) and the image (FIG. 11B).

In the case in which at step S110 there is no detection of a key 143 operation, rather than directly returning to step S108, it is possible to provide a step that detects an operation of another prescribed key, in which case if operation of that key is detected, the display of the background image is gradually removed, so that display is made of only the mail text. In this case as well, return to step S100 is made when detection is made of another operation of the other prescribed key. If this is done, not only is there switching between the display of the image overlaid with the mail text (refer to FIG. 11C) and the display of the image (FIG. 11B), but it is also possible to make switching between a display of the image overlaid with the mail text (refer to FIG. 11C) and the display of the mail text only, thereby enabling certain visual verification, as required, of either the background image or the mail text.

A second embodiment of the present invention is described below. In this second embodiment, because the system configuration, outer appearance of the cell phone, and major aspects of the cell phone configuration are similar to the first embodiment, there descriptions will be omitted herein.

Figure 15:
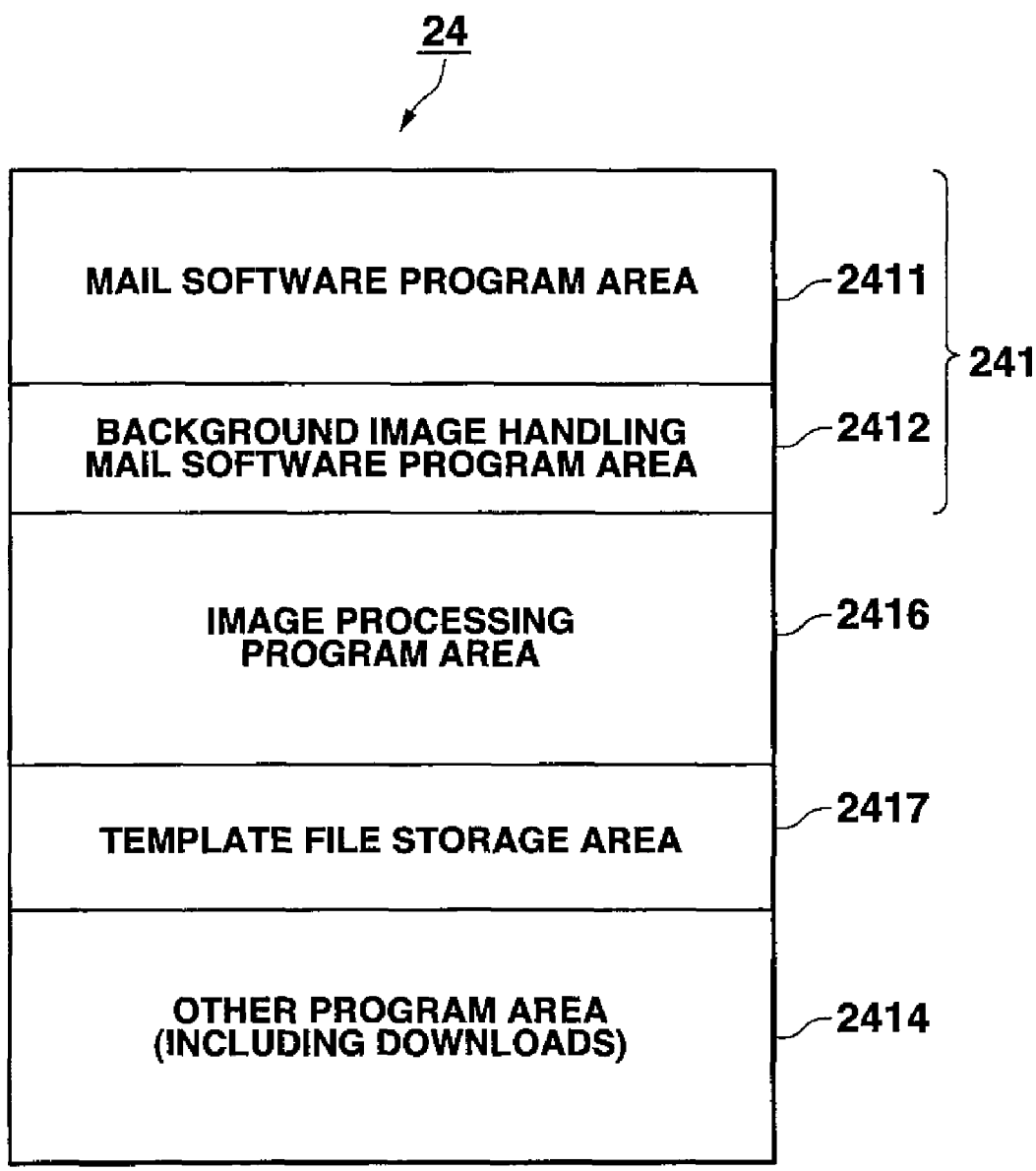
FIG. 15 is a conceptual representation of the configuration of the memory areas of the ROM 24 in a second embodiment of the present invention.

FIG. 15 is a conceptual representation of the configuration of the memory areas in the ROM 24 of a cell phone in the second embodiment of the present invention. Elements corresponding to elements in FIG. 4 are assigned the same reference numerals as in FIG. 4, and are not described herein. ROM 24 is formed by a mail software program area 241, an image processing program area 2416, a template file storage areas 2417, and an other program area 2414.

The mail software program area 241 is separated into a mail software program area 2411 into which is stored a known general mail software program, and a background image display handling mail software program area 2412 into which is stored a background image display handling mail software program. The background image display handling mail software program can also be downloaded from WWW5.

The template file storage area 2417 is an area into which is stored a template file (filtering function file) required to add special effects (such as changing the image brightness, soft focus, and changing the image color to sepia) based on an image processing program at the time of displaying an image. The template file storage area 2417 in the second embodiment is used to store at least a plurality of template files having different brightnesses. In the second embodiment, rather than performing processing of the brightness of an attached image itself, a filtering function (template file) that changes the brightness is displayed is overlaid in the display region in which the mail text, thereby changing the brightness of the background image. More specifically, based on brightness correction data established by each template file, correction is done of the brightness of the background image displayed in the display region for displaying the mail text.

Figure 16:
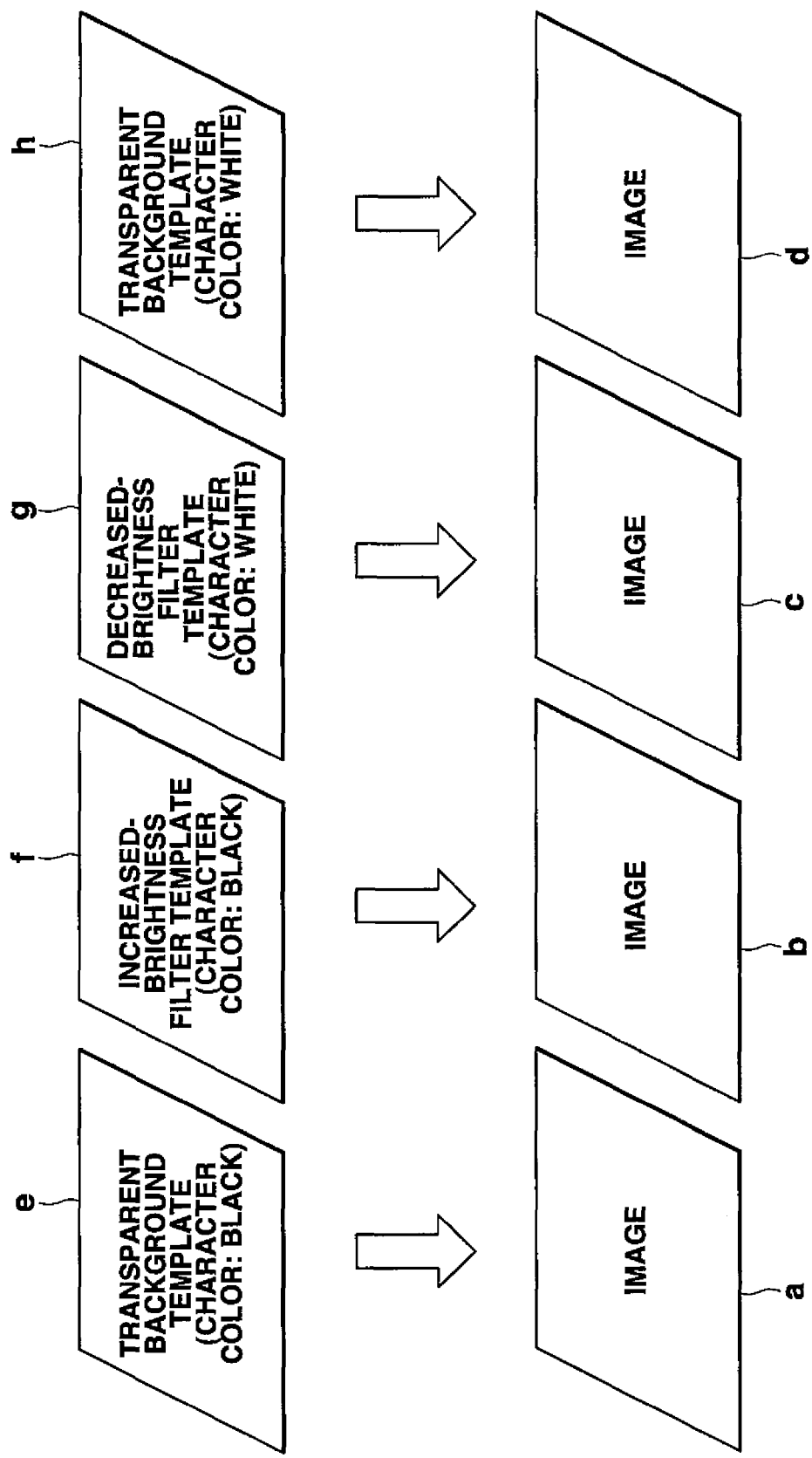
FIG. 16 is a conceptual representation illustrating the overlaying processing of the image with a template file.

FIG. 16 is a conceptual representation illustrating the overlaying processing of the image and the template file in the second embodiment. In the case in which the brightness of the image a is greater than the threshold value TH1, a transparent background template file (character color: black) e, that is, a template file having a brightness correction value of 0 and also setting the character display color to black is overlaid.

In the case in which the brightness of image b is greater than the intermediate value M and less than the threshold value TH1, or is the intermediate value M, a increased-brightness template file (character color: black) f, this being a template file having a positive brightness correction value and also setting the character display color for the mail text to black is overlaid.

In the case in which the brightness of the image c is less than the intermediate value M and greater than the threshold value TH2, a decreased brightness template file (character color: white) g, this being a template file having a negative brightness correction value and also setting the character display color for mail text for white is overlaid.

In the case in which the brightness of image d is less than the threshold value TH2, a transparent background template file (character color: white) h, this being a template file with a bright correction value of 0 and which also sets the character display color for mail text to white is overlaid.

Essentially, in the second embodiment of the present invention, rather than processing so as to change the brightness of the image itself, correction is done of the displayed brightness of an image, based on brightness correction data established by each template file. In the second embodiment, therefore, it is possible to attach the original image to the e-mail as is. In this case, it is necessary to add to the mail information specifying the template file, this specifically being the addition of the template file number. Because of this, the second embodiment of the present invention is provided with a template number storage area in the mail data storage area 292.

FIG. 17 is a conceptual representation of the configuration of the mail data storage area in this embodiment. Comparing the configuration of the mail data storage area 292 in this embodiment with the configuration of the mail data storage area in the first embodiment shown in FIG. 6, the mail data storage area 292 in the second embodiment is the same as the mail data storage area 292 of the first embodiment, with the exception of the addition of the template number storage area.

Because whether or not a received e-mail has a background image attached can be judged by whether or not a template number has been added to the mail, the signal configuration of an e-mail with a background image can be made a signal configuration to which mail type identification information is not added. In this case, the region shown in FIG. 17 for storing the mail type identification information provided in the mail data storage area 292 is not absolutely needed.

Figure 18:
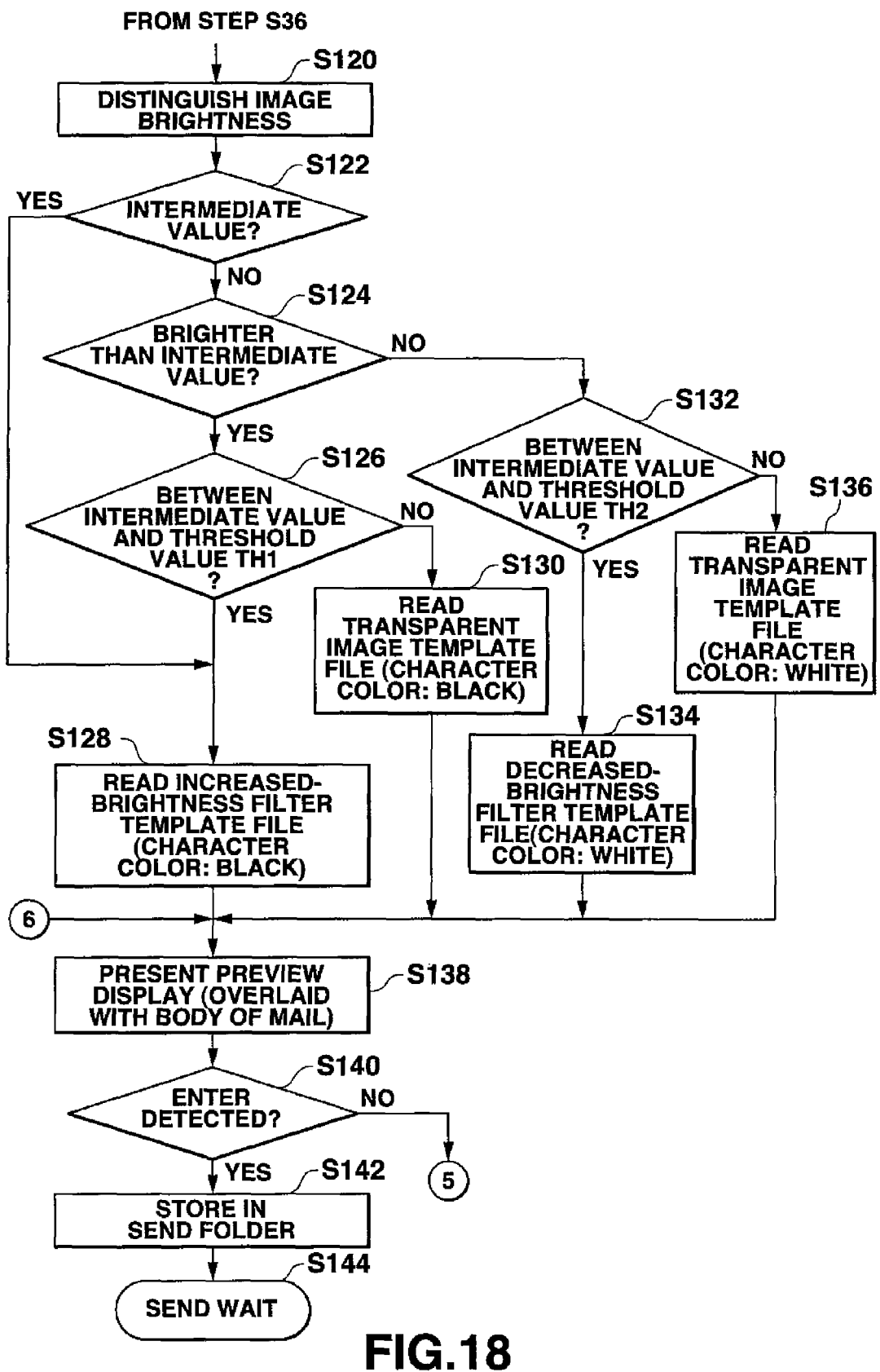
FIG. 18 and FIG. 19 are flowcharts illustrating the mail creation processing in the second embodiment of the present invention.
Figure 19:
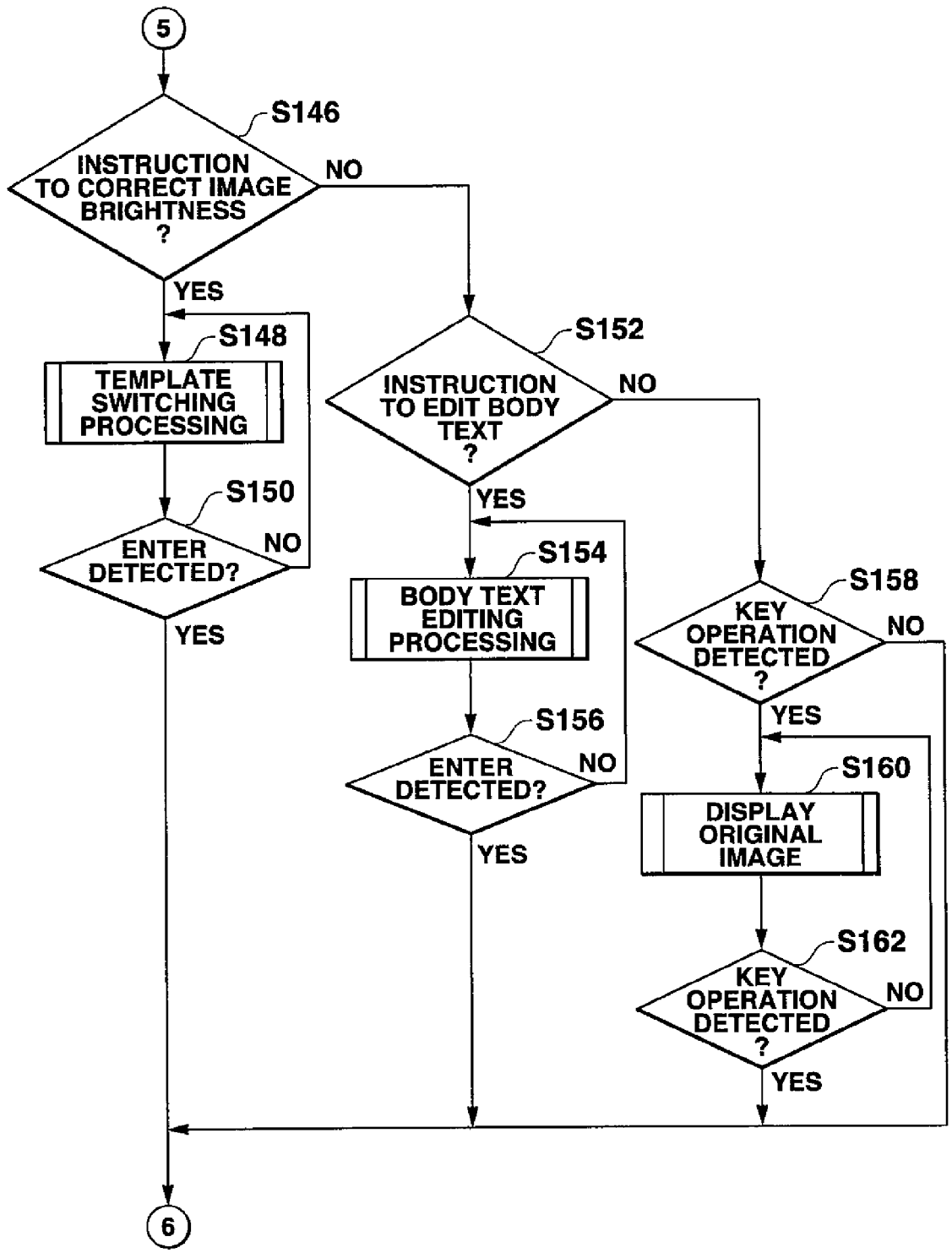

The operation of the second embodiment is described below. In this description FIG. 18 and FIG. 19 collectively form a flowchart illustrating the mail creation processing in the second embodiment. Because the processing prior to the flowchart shown in FIG. 18 and FIG. 19 (creation and image selection) is the same as in steps S10 to S36 of FIG. 7 and FIG. 8, these are not described herein.

In performing mail creation processing, at step S36 of FIG. 8 when an image to attach to an e-mail is selected from the album display, the brightness of the selected image is distinguished (step S120). Then a judgment is made as to whether or not the image brightness is the intermediate value M (step S122). If the image brightness is the intermediate value M, the increased-brightness filter template file (character color: black) is read out(step S128). The display brightness of the image is corrected based on the read out template file, and an overlaid display (preview display) is made (step S138) of the brightness-corrected image with the mail text created at step S22 laid thereover.

If the image brightness is not the intermediate value M, a judgment is made as to whether or not the image brightness is greater than the intermediate value M (step S124 and, if it is greater than the intermediate value M, a further judgment is made as to whether or not the image brightness is between the intermediate value M and the threshold value TH1 (where intermediate value M c threshold value TH1) (step S126). If the image brightness is between the intermediate value M and the threshold value TH1, an increased-brightness filter template file (character color: black) is read out (step S128) the same as is done in the case in which the image brightness is the intermediate value M, the image display brightness is corrected based on the read out template file, and an overlaid preview display is made (step S138) of the brightness-corrected image with the mail text created at step S22 laid thereover. If the image brightness is not between the intermediate value M and the threshold value TH1, that is, if it is brighter than the threshold value TH1, a transparent background template file (character color: black) is read out (step S130). Because this template has a brightness correction value of 0, without performing correction of the image brightness, the overlaid preview display is made (step S138) of the uncorrected image with the mail text created at step S22 laid thereover.

If the image brightness is less than the intermediate value M, however, a judgment is made as to whether or not the image brightness is between the intermediate value M and the threshold value TH2 (where intermediate value M>threshold value TH2) (step S132). If the image brightness is between the intermediate value M and the threshold value TH2, a reduced-brightness filter template file (character color: white) is read out (step S134). The display brightness of the image is corrected based on the read-out template file and the mail text character color is set to white, after which an overlaid preview display is made (step S138) of the brightness-corrected image with the mail text created at step S22 laid thereover. If the image brightness is not between the intermediate value M and the threshold value TH2, that is, if the image brightness is darker than the threshold value TH2, a transparent background template file (character color: white) is read out (step S136). Because the brightness correction value of this template is 0, without performing correction of the display brightness of the image, the mail text display character color is set to white, after which an overlaid preview display is made (step S138) of the brightness-corrected image with the mail text created at step S22 laid thereover.

As described above, in the preview display made at step S138 a template file for overlay is selected by means of distinguishing the brightness of the original image, and the brightness correction and setting of the displayed character color are done based on the selected template, after which an overlaid preview is made on the display 13 with the image and mail text overlaid.

Next, a judgment is made as to whether or not a user entry instruction (instruction to finalize the mail content) has been detected (step S140). If the user entry instruction is detected, the mail data currently being worked on is stored in the send folder 2922 of the mail data storage area 292 (step S142), after which transition is made to the send wait condition or a wait for an end instruction (step S144).

In this embodiment of the present invention, the configuration is such that the original image itself and the template number are added to the mail text and sent, the original image being stored in association with the mail text into the file attachment storage area 293.

Therefore, at the storage processing of step S142 of the mail data being created and stored in the working area 2921, data other than the file attachment addresses, that is, destinations, subjects, mail body texts, and MTF mail type flags, and template numbers is stored in areas corresponding to the send folder 2922. In the file attachment address storage area of the send folder 2922 are stored addresses in the file attachment storage area 293 in which the above-described original images are stored. The MSF identification flags in the send folder 2922 are set to the condition that indicates unsent mail ("0").

Mail data stored in the send folder 2922 (subjects and mail texts), when in the waiting condition of step S144 or thereafter when an instruction is given to send mail and this mail data is read out from the send folder 2922, is sent to the specified destination along with an image specified by the file attachment address and the mail type flag MTF. When this is done, the time sent is stored in the sent date and time storage area of the send folder 2922, and the identification flag MSF is set to the condition indicating the sent condition ("1").

A cell phone having received this e-mail stores the received mail data in an area corresponding to the receive folder 2923, and stores the time of receipt in the date/time received storage area. When this is done, the MRF identification flag in the receive folder 2923 is set to the condition indicating not display (not verified) ("0"). In this case, because the mail type flag of the received mail indicates that the e-mail has an image (background image), when the mail is read out of the receive folder 2923 and displayed, the image attached to the mail is displayed as a background image after compensation based on the template number, and the mail text is displayed thereover in a color specified by the template number.

The signal configuration of an e-mail with a background image is one in which mail type identification information is not added, and in the case in which no area is provided in the receive folder 2923 for storing the mail type identification flag MTF, based on whether or not there is data in a template number storage area a judgment is made as to whether or not the mail is a mail with an attached background image, processing being performed as to whether or not to use the image attached thereto as a background image.

In the case in which at step S140 an entry instruction is not detected, detection is performed as to whether or not an instruction is given to correct the image brightness (step S146). If an instruction to correct the image brightness is detected, template switching processing is performed manually (step S148). Then an judgment is made once again as to whether or not an entry instruction is detected (step S150). If an entry instruction is detected, return is made to step S148, and the template switching processing is continued. If an entry instruction is detected, return is made to step S138, and after setting the image brightness and mail text character display color based on the step S148 selected template, an overlaid preview display is made of the mail text and the image.

In the case in which at step S146 it was not possible to detect an instruction for image brightness correction, detection is performed of whether or not an instruction is made to edit the mail text (step S152). At step S152 if an instruction to edit the mail text is detected, with the background image display remaining as is, correction of carriage return positions in the mail text and display positions, or editing of the mail text itself is done (step S154). Then once again a judgment is made as to whether or not an entry instruction is detected (step S156). If no instruction is given, return is made to step S154, and the mail text editing continues.

In the case in which an entry instruction is detected a step S156, return is made to the above-described step S138, at which an overlaid preview display is made of the mail text and the image.

In the case in which an instruction to edit the mail text is detected at step S152, a judgment is made as to whether or not a key 143 operation is made, that is, whether an instruction to display the background image has been made (step S158). In the case in which a key 143 operation was not made, return is made to step S138, and the preview display is continued.

If a key 143 operation is made, however, the original image shown in FIG. 11A is displayed. Next, a judgment is made again as to whether or not a key 143 operation is made (step S162), In the case in which a key 143 operation is not made, return is made to step S160, and the preview display is continued. If a key 143 operation is made with the original image displayed, however, return is made to step S138, at which the preview display is made.

That is, when making the preview display it is possible to adjust the brightness of the background image, or to edit the mail text and verify the original image or the like.

Although this embodiment is described for an example in which there are 3 original image brightness judgment levels and in which 4 types of templates are used, it will be understood that it is possible in the present invention to use a larger number of original image brightness judgment levels or a greater number of types of template files. If this is done, it is possible to make the image brightness after correction using a template come close to a desired brightness (for example, the threshold values TH1 or TH2 shown in FIG. 10).

The processing for displaying received mail in the second embodiment is described below. Since this processing is substantially the same as the processing for displaying received mail in the first embodiment shown in FIG. 13, the description will be made with reference to FIG. 13.

The processing for displaying received mail in the second embodiment, in the same manner as the received mail display processing in the first embodiment, is done by selecting the receive folder from the mail menu display condition so as to display a list of received mail (step S90 to step S94).

When the user selects a mail to be displayed from the received mail list, the controller 22 makes a judgment, based on the value of the MTF identification flag of the selected mail as to whether or not a mail with a background image has been selected (step S96). In the case in which an MTF mail identification flag storage area is not provided in the receive folder 2923, a judgment is made as to whether or not an e-mail with a background file attached is selected, based on number data in the template number storage area of the selected mail.

In the case in which a mail with a background image is not selected, flow proceeds to normal mail processing (step S98), but in the case in which mail with a background image is selected, flow proceeds to processing that sets the attached image as the background and displays the mail text on the display 13 (step S100). In this display processing, the brightness of the image to be displayed as the background is corrected and the color of the characters displayed are set based on the template specified by the number of the template attached to the mail.

Next, a judgment is made as to whether or not a cancel operation has been made by the user (step S102), a judgment is made as to whether and ending operation has been made (step S104), and a judgment is made as to whether or not a key 143 operation has been made, these judgments being made in this sequence, and if none of these operations has been made, return is made to step S100, and the display of the image with the mail text overlaid thereover is continued.

In the case in which, at step S102, the cancel operation is detected, return is made to step S94, and in the case in which an ending operation is detected at step S104, return is made to the mail menu display. If the key 143 operation is made at step S106, transition is made to display of only the background image at step S108. Whereas in the first embodiment, because an image attached to an e-mail for use as a background image is a brightness-adjusted image, at the image display at step S108 is a brightness-adjusted image, such as shown in FIG. 11B, in the second embodiment because the original image is itself attached to the e-mail, the original image is displayed, as shown in FIG. 11A. That is, in the in which there is an operation of the key 143, the mail text display is gradually removed, defocused, or faded out, and a gradual transition is made from the brightness-adjusted image shown in FIG. 11B to the original image as shown in FIG. 11A, by having the brightness of the displayed image approach the brightness of the original image.

Next, a judgment is made as to whether or not a key 143 operation is made (step S110) and, if a key 143 operation is not made, return is made to step S108, and the image display is continued. If a key 143 operation is made with the image displayed, however, return is made to step S100, the brightness of the displayed image being gradually changed to the brightness specified by the template, and the mail text being gradually displayed or faded-in, so that an overlaid display of the mail text on the image is made.

Thus, each time the key 143 operation is made, an alternating display is made so that there is gradual switching between a display onto which the mail text is overlaid (refer to FIG. 11C) and the original image (FIG. 11A).

In the second embodiment as well, in the case in which a key 143 operation is not detected at step S110, rather than returning directly to step S108 a step that detects the operation of another prescribed key can be provided, and if that other key operation occurs, the original image display is removed, so that only the mail text is displayed. In this case as well, the return to step S100 is made when the additional operation of the prescribed other key is detected. By doing this, because not only is it possible to make a switched display between the image with the overlaid mail text (refer to FIG. 11C) and the display of the original image (FIG. 11A), but it is also possible to make a switched display between the image with the overlaid mail text (refer to FIG. 11C) and the display of the mail text only, it is possible as required to make certain visual verification of either the background image or the mail text.

A third embodiment of the present invention is described below.

The third embodiment of the present invention is a method for sending an original image itself in the case in which an image is attached to a mail text, and also a method for sending, attached to the mail text, information (flag information) that gives an instruction to display the attached image as a background image of a mail text and brightness correction data for use when displaying the attached image as a background image in the case in which an attached image is displayed as a background image of a mail text on the receiving-side display. By doing this, in the case of making a setting at the receiving side that uses an attached file as a background image, the brightness of the attached image is corrected in accordance with the attached brightness correction data and used as the background image for the mail text.

In this third embodiment, because the system configuration, outer appearance of the cell phone, and major aspects of the cell phone configuration are similar to the first embodiment, there descriptions will be omitted herein.

Figure 20:
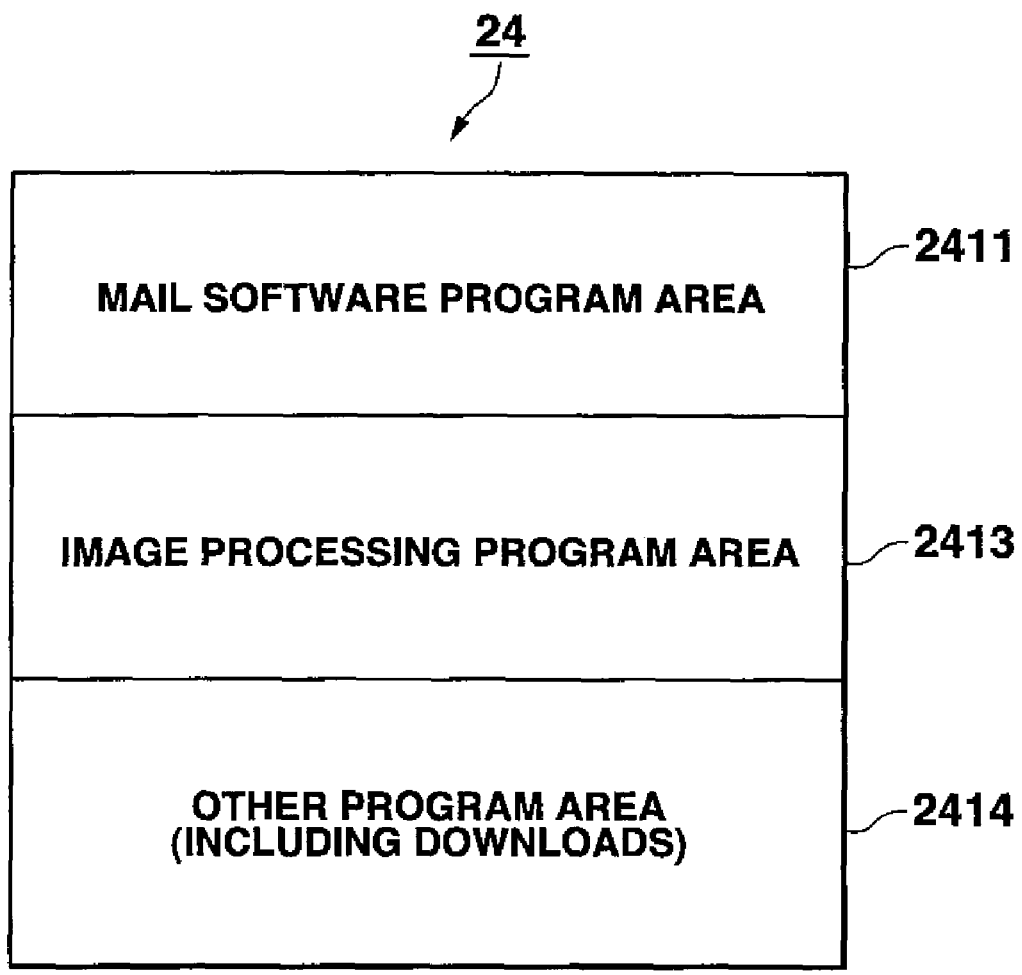
FIG. 20 is a conceptual representation of the configuration of the memory areas of the ROM 24 of a cell phone in a third embodiment of the present invention.

The configuration of the third embodiment will now be described. FIG. 20 is a conceptual representation of the configuration of the memory areas of the ROM 24 of a cell phone according to the third embodiment. Elements corresponding to elements in FIG. 4 are assigned the same reference numerals as in FIG. 4, and are not described herein. ROM 24 is formed by a mail software program area 2411, an image processing program area 2416, and an other program area 2414. Thus, whereas the first embodiment and the second embodiment have configurations in which two types of mail software programs (that is, a normal mail software program and a background image display handling mail software program), in the third embodiment there is only one time of mail software program.

FIG. 21 is a conceptual representation of the configuration of the mail data storage area 292 in this embodiment. Comparing the configuration of the mail data storage area 292 in this embodiment with the configuration of the mail data storage area in the first embodiment shown in FIG. 6, the mail data storage area 292 in the third embodiment is the same as the mail data storage area 292 of the first embodiment, with the exceptions that in the mail data storage area 292 of the third embodiment, in place of the area for storage of the mail type identification information MTF, and area is provided for storage of a BDF identification flag, which indicates whether or not an image attached to an e-mail is to be displayed as the background image of the mail, and also that there is provided an area for storage of a correction value for correcting the brightness of the image when displaying an image attached to an e-mail as the background image for the mail.

The operation of the third embodiment of the present invention is described below, taking the operation when creating an e-mail first.

Figure 22:
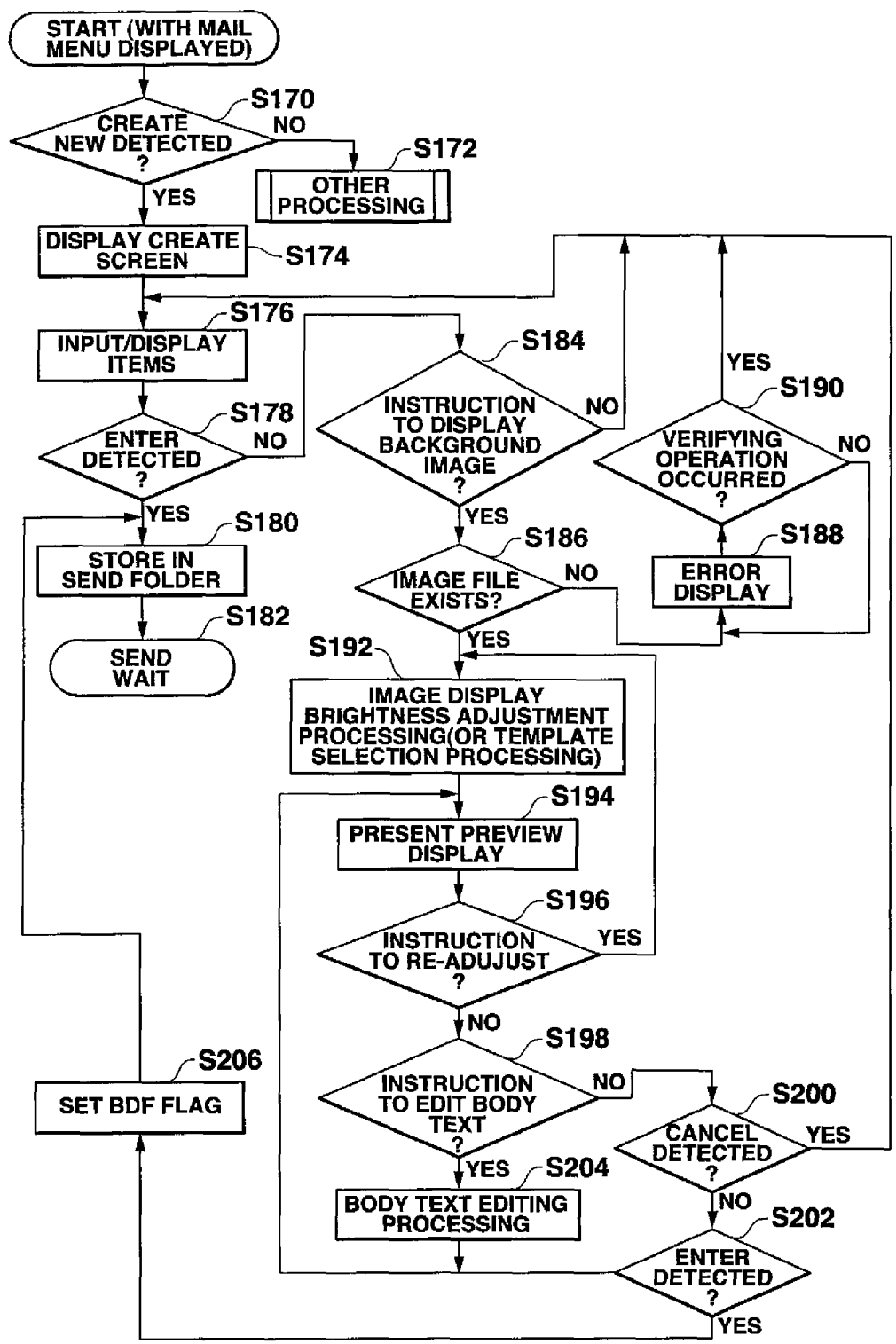
FIG. 22 is a flowchart illustrating the mail creation processing in the third embodiment of the present invention.

FIG. 22 is a flowchart illustrating the mail creation processing in the third embodiment. The flowchart of FIG. 22 starts from the condition in which the mail menu is being displayed.

First, a judgment is made as to whether or not an instruction has been given from the mail menu to create a new e-mail (step S170) In the case in which an instruction to create a new e-mail is not detected, the flow transitions to other processing (step S172).

If an instruction to create a new e-mail is detected, however, a menu screen for creating an e-mail is displayed on the display 13 (step S174). This menu screen displays data that must be input to create an e-mail, such as the destination, the subject, the mail text, and a file attachment and the like.

Next, when data is input for selected items or a file to be attached is selected, the data for each of the input items is stored in an area corresponding to the items in the working area 2921, and the input data (data of each item) is displayed on the display 13 (step S176).

At this stage, the user can either select the sending of the file selected as a file attachment at the step S176 as a normal file attachment or select the sending of the file attachment as a background image for the mail text. In the case in which the user wishes to send the image file as a normal file attachment, an entry (verification) instruction is given, and if the user wishes to sent the image file as the background image of the mail text, the user performs an instruction for an background image.

Therefore, the controller 22 makes a judgment as to whether or not an entry (verification) instruction has been given for the input data (step S178). In the case in which the entry instruction is given, the mail data currently being worked with is stored into the send folder 2922 of the mail data storage area 292 (step S180), after which a wait is made for either a send instruction or an ending instruction (step S182).

In the third embodiment, as described above, in the case in which an image is attached to an e-mail, the method used is that of attaching the original image itself, and also sending information (flag information) that indicates that an attached image is to be used as the background image for the mail text and brightness correction data for display of the attached image as the background image.

In the storage processing at step S180, therefore, of the mail data currently being worked on stored in the working area 2921, data other than the file attachment address, this being the destination, the subject, the mail text, the BDF background image display identification flag, and image brightness correction value, is stored in corresponding areas in the send folder 2922. The address in the file storage area 293 into which the original image is stored is stored in the file attachment address storage area of the send folder 2922. At this stage, however, even if there is an image attached to the mail, the setting of this image as a background image for the mail text has not yet been made, the information of BDF background image display identification flag of the working area 2921 is information (the value 0) that indicates that a background image display is not to be made, and the image brightness correction value has not been set. Therefore, information is set into the BDF background image display identification flag (the value 0) indicates that a background image display is not to be made, and the image brightness correction value remains unset. The MSF identification flag of the send folder 2922 is set to the unsent condition (0).

In the case, however, in which at step S178 there is no detection of an entry (verification) operation in the input data, detection is made of whether or not a background image display instruction has been made (step S184). In the case in which a background image display instruction is not detected, return is made to step S176. If a background image display instruction is detected, however, detection is made as to whether or not an image file was attached at step S176 (step S186). In the case in which an image file had not been attached, an error display is made (step S188), this error display being maintained until the user makes a verification operation at step S190, and when the user-made verification operation is detected, return is made to step S176.

When the presence of an attached image file is detected at step S186, the attached image file is displayed on the display 13 and user adjustment of the image brightness is permitted (step S192). When the user adjusts the brightness of the displayed image, the adjustment value (correction value with respect to the brightness of the original image) is stored in the correction value storage area of the working area 2921. The display brightness correction of the image is continued until the user indicates the end of adjustments, at which point the correction value stored in the correction value storage area of the working area 2921 is also updated. When the user indicates the end of adjustments, an overlaid display of the mail text with the display brightness corrected image is made (preview display) (step S194).

If the user views the preview display at step S194 and is satisfied with the display, the user makes an entry (verification) operation. If the user is not satisfied with the displayed preview, however, the user can re-adjust the displayed brightness of the background image, adjust the mail text, or cancel the background image display.

In the condition with the preview display shown on the screen, the controller 22 performs a detection of whether or not a re-adjustment instruction is given (step S196), a detection of whether or not a text edit instruction is given (step S198), a detection of whether or not a cancel instruction is given (step S200), and a detection of whether or not an entry instruction is given (step S202).

If at the step 196 a re-adjustment instruction is detected, return is made to the display bright adjustment processing of step S192. If a text edit instruction is detected at step S198, the same text editing processing is performed as at step S80 in FIG. 9 (step S204), after which return is made to the preview display of step S194.

If a cancel instruction is detected at step S200, the correction value stored in the correction value storage area of the working area 2921 is cleared, and return is made to the item data input and display processing of step S176.

If an entry instruction is detected at step S202, the BDF background image display identification flag is set to "1" (step S206), after which the storage processing of step S180 is executed. After the processing of step S206, at the storage processing of step S180, because the information of the BDF background image identification flag in the working area 2921 is information indicating the making of a background image display ("1"), of the mail data currently being worked on in the working area 2921, all data with the exception of the attached file address is stored in the corresponding areas of the send folder 2922. Into the file attachment address storage area of the send folder 2922 is stored the address in the file attachment storage area 293 in which the above-noted original image is stored.

If an instruction to send occurs in the waiting condition of step S182 or thereafter in the condition in which mail data is read out from the send folder 2922, the mail data (subject and mail text) stored in the send folder 2922 is sent to the specified destination, along with the image brightness correction value and the BDF background image display identification flag. When this is done, the time sent is stored into the date and time sent storage area of the send folder 2922, and the SDF identification flag is set to "1" to indicate the sent condition.

The cell phone that receives the above-noted mail stores the received mail data in a corresponding area of its receive folder, and records the time of receipt in the received date and time storage area. When this is done, the MRF identification flag is set to "0" to indicate that the mail has not yet been read. In this case, if the BDF background image identification flag of the received mail is "1", because this indicates the attached image is to be displayed as a background to the mail text, when the mail is read from the receive folder 2923 and displayed, the brightness of the attached to the mail is first adjusted in accordance with the brightness of the attached image and then displayed as the background image, over which the mail text is displayed.

The signal configuration of an e-mail with a background image is one in which background image display identification flag information is not added, and in the case in which no area is provided in the receive folder 2923 for storing the BDS background image display identification flag, based on whether or not there is data in an image brightness correction value storage area, a judgment is made as to whether or not the mail is a mail with an attached background image, processing being performed as to whether or not to use the image attached thereto as a background image.

Although this embodiment of the present invention is for the case in which the mail text is superimposed over the image after processing to adjust the brightness of an image has been completed so as to make a preview display, it will be understood that it is alternatively possible to display the mail text on the background image at the time of display brightness adjustment processing of the image at step S192, in which case it is not necessary to make the preview display at step S194, and an instruction by the user to end the adjustment is detected as an entry instruction at the step S196.

Next, the mail receiving processing in the third embodiment will be described. Mail receiving processing in the third embodiment is substantially the same as in the first and second embodiments of the present invention. The receiving processing in the third embodiment is different from the mail receiving processing of the first and second embodiments in that the detection processing to determine whether or not a mail with a background image is selected at step S96 of the flowchart of FIG. 13 is done by either by the information (value) of the BDF identification flag of the selected mail, or by whether or not there is a brightness correction value, in that an image that has a brightness corrected based on an image brightness correction value attached to the mail is used as the background image in the mail text display at step S100, and in that in the image display at step S108 the image attached to the mail itself is displayed.

Figure 23:
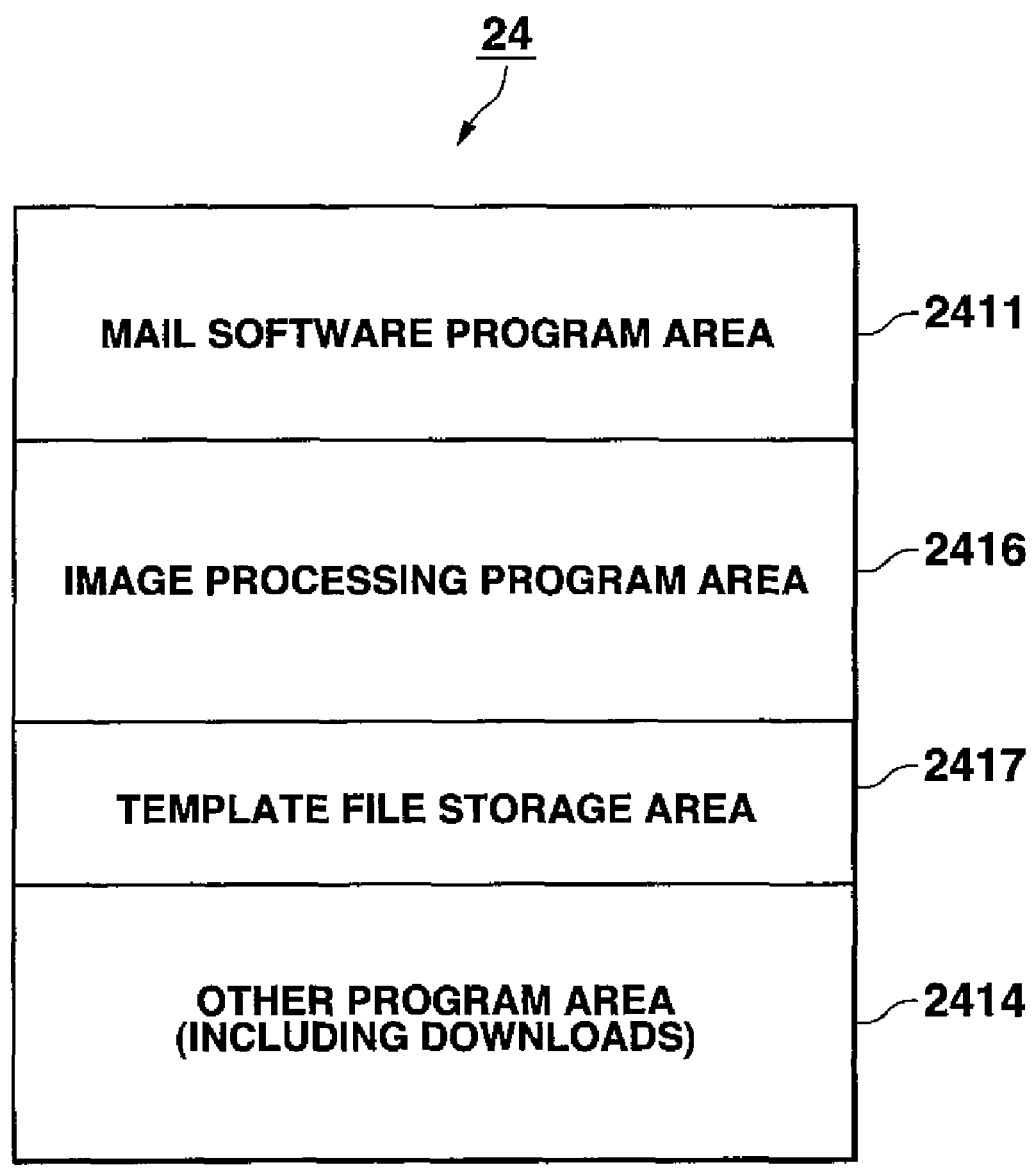
FIG. 23 is a conceptual representation of another example of the configuration of the memory areas of the ROM 24 in the third embodiment of the present invention.

Additionally, although in this embodiment, the display of the background image of the mail text is done by performing correction in accordance with the brightness of the original image, it is alternatively possible to adopt a system of using a template, as in the case in the second embodiment, in which case the ROM 24 of the cell phone can be provided with a template file storage area, such as shown in FIG. 23, selection processing to select a template for use in display brightness adjustment of the image being performed at step S192 of the mail creation processing, and in mail sending processing the number of the template selected being sent in place of the image brightness correction value.

A fourth embodiment of the present invention is described below.

In contrast to the first to third embodiments of the present invention, in which, after launching the mail mode by a mail key operation from the wait condition the new mail creation mode is selected from the mail menu, after which selection is made of a background image from the new mail creation mode, or an attached image is specified as the background image, after which sending was done, in the fourth embodiment of the present invention, when an image photographed by the camera module is being displayed, or when an image is read out from an image file, selection is made of sending from a sub-menu of this mode, or the mail key is operated to enter the mail creation mode, and specify and send a displayed image as the background image for the mail text.

In the fourth embodiment, similar to the case of the third embodiment, the system used is one of sending the original image itself as a file attachment to the mail text, and one in which, in addition to attaching an image that had been displayed to an e-mail, information (flag information) indicating that the attached image is to be used as the background image for the mail text and brightness correction data for display of the attached image as a background image are attached to the mail before sending the mail. By doing this, the brightness of the attached image is corrected at the receiving side based on attached brightness correction data and the corrected image used as the background image for the body text. Because the system configuration, outer appearance of the cell phones, and general configuration of the cell phones are the same as in the first embodiment, they are not described herein.

The configuration of the fourth embodiment in terms of the ROM 24 and the mail data storage area 292 and the like can be the same as that of the third embodiment.

The operation of the fourth embodiment of the present invention is described below, taking first the case of mail creation processing.

Figure 24:
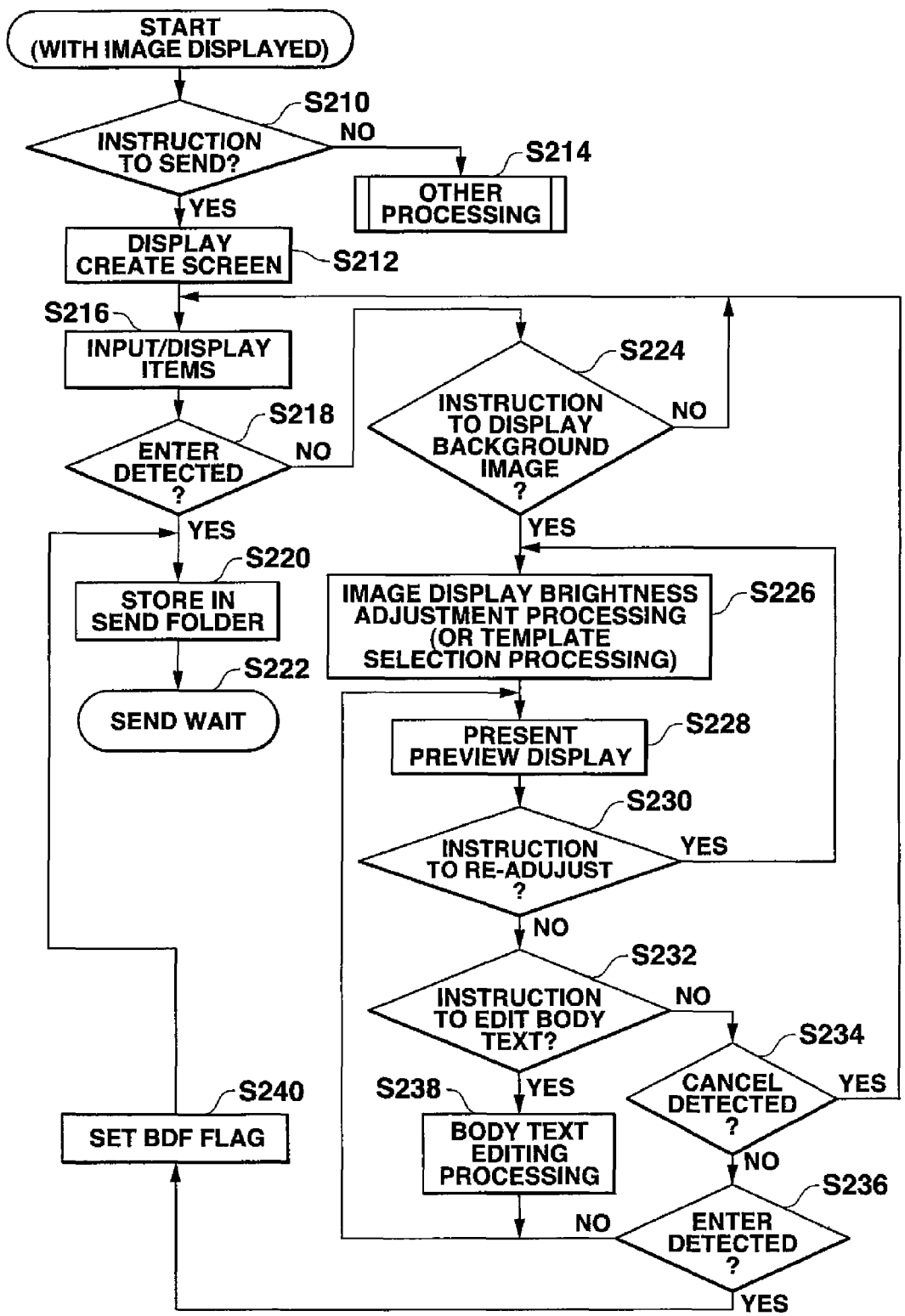
FIG. 24 is a flowchart illustrating the mail creation processing in a fourth embodiment of the present invention.

FIG. 24 is a flowchart illustrating the processing of mail creation in the fourth embodiment. This flowchart starts from the condition in which a screen that displays an image captured by the camera module or read in from an image file is displayed by the display 13.

In this display condition, a judgment is made as to whether or not an instruction is made to send (step S210). More specifically, this judgment is a judgment as to whether or not sending has been selected from a sub-menu of the image mode, or a judgment as to whether or not a mail key 141 operation is made in the image mode.

If the send instruction is detected, the mail creation screen is displayed on the display 13 (step S212) and if a different instruction is detected, flow proceeds to the other processing (step S214). At the creation screen of step S212, items that must be input to create an e-mail, such as the destination, the subject, the mail text, and a file attachment and the like.

Next, when data is input for selected items or a file to be attached is selected, the data for each of the input items is stored in an area corresponding to the items in the working area 2921, and the input data (data of each item) is displayed on the display 13 (step S216). The image displayed before the send instruction is automatically set as one of the file attachments at step S216.

At this stage, the user can send an image (image that is displayed at the time of the start) that was automatically set as a file attachment at the processing of step S216 as a normal file attachment, or can select the sending of the image as a file attachment for use as the background image for the mail text. In the case in which the user sends the image file as a normal file attachment, the entry instruction is given, and in the case in which the image file is to be sent as a file attachment for use as a background image for the mail text, a background image display instruction is given.

Therefore, the controller 22 makes a judgment as to whether or not an entry (verification) instruction has been given for the input data (step S218). In the case in which the entry (verification) instruction is given, the mail data currently being worked with is stored into the send folder 2922 of the mail data storage area 292 (step S220), after which a wait is made for either a send instruction or an ending instruction (step S222).

In the above-described fourth embodiment, similar to the case of the third embodiment, in the case in which an image is attached to an e-mail, the method used is that of attaching the original image itself, and also sending information (flag information) that indicates that an attached image is to be used as the background image for the mail text and brightness correction data for display of the attached image as the background image.

In the storage processing at step S220, therefore, of the mail data currently being worked on stored in the working area 2921, data other than the file attachment address, this being the destination, the subject, the mail text, the BDF background image display identification flag, and image brightness correction value, is stored in corresponding areas in the send folder 2922. The address in the file storage area 293 into which the original image is stored is stored in the file attachment address storage area of the send folder 2922.

At this stage, however, even if there is an image attached to the mail, the setting of this image as a background image for the mail text has not yet been made, the information of BDF background image display identification flag of the working area 2921 is information (the value 0) that indicates that a background image display is not to be made, and the image brightness correction value has not been set. Therefore, information is set into the BDF background image display identification flag (the value 0) indicates that a background image display is not to be made, and the image brightness correction value remains unset. The MSF identification flag of the send folder 2922 is set to the unsent condition (0).

In the case, however, in which at step S218 there is no detection of an entry (verification) operation in the input data, detection is made of whether or not a background image display instruction has been made (step S224). In the case in which a background image display instruction is not detected, return is made to step S216. If a background image display instruction is detected, however, the image automatically set as the file attachment by the processing of step S216 (image displayed the time of the start) is displayed on the display 13, and the user can adjust the displayed brightness of the image (step S226). When the user adjusts the brightness of the displayed image, the adjustment value (correction value with respect to the brightness of the original image) is stored in the correction value storage area of the working area 2921. The display brightness correction of the image is continued until the user indicates the end of the adjustment, at which point the correction value stored in the correction value storage area of the working area 2921 is also updated. When the user indicates the end of adjustments, an overlaid display of the mail text with the display brightness corrected image is made (preview display) (step S228).

If the user views the preview display at step S228 and is satisfied with the display, the user makes an entry (verification) operation. If the user is not satisfied with the displayed preview, however, the user can re-adjust the displayed brightness of the background image, adjust the mail text, or cancel the background image display.

In the condition with the preview display shown on the screen, the controller 22 performs a detection of whether or not a re-adjustment instruction is given (step S230), a detection of whether or not a text edit instruction is given (step S232), a detection of whether or not a cancel instruction is given (step S234), and a detection of whether or not an entry instruction is given (step S236).

If at the step S230 a re-adjustment instruction is detected, return is made to the display bright adjustment processing of step S226. If a text edit instruction is detected at step S232, the same text editing processing is performed as at step S80 in FIG. 9 and step S2020 in FIG. 22 (step S238), after which return is made to the preview display of step S228.

If a cancel instruction is detected at step S234, the correction value stored in the correction value storage area of the working area 2921 is cleared, and return is made to the item data input and display processing of step S216.

If an entry instruction is detected at step S236, the BDF background image display identification flag is set to "1" (step S240), after which the storage processing of step S220 is executed. After the processing of step S206, at the storage processing of step S220, because the information of the BDF background image identification flag in the working area 2921 is information indicating the making of a background image display ("1"), of the mail data currently being worked on in the working area 2921, all data with the exception of the attached file address is stored in the corresponding areas of the send folder 2922. Into the file attachment address storage area of the send folder 2922 is stored the address in the file attachment storage area 293 in which the above-noted original image is stored.

If an instruction to send occurs in the waiting condition of step S182 or thereafter in the condition in which mail data is read out from the send folder 2922, the mail data (subject and mail text) stored in the send folder 2922 is sent to the specified destination, along with the image brightness correction value and the BDF background image display identification flag. When this is done, the time sent is stored into the date and time sent storage area of the send folder 2922, and the SDF identification flag is set to "1" to indicate the sent condition.

As noted above, in the fourth embodiment of the present invention, if a send instruction is given in the condition in which an image is displayed, the new mail creation mode is selected, and with the exception of the fact that the image that had been displayed being automatically set as the file attachment, the fourth embodiment is the same as the third embodiment. Therefore, although the partial variations in the mail creation processing and received mail display processing were described above, items that were described above with regard to the third embodiment have not been repeated where they are the same as in the fourth embodiment.

It will be understood that the foregoing embodiments are presented as exemplary and do not restrict the present invention, which can be embodied in other forms and manners that are encompassed by the spirit of the present invention as recited in the attached claims.

What is claimed is:

1. A data reception apparatus for receiving one set of data including at least an image and a text from an external device via a communication network, comprising:
    a receiving means for receiving data;
    a displaying means for displaying the text on the basis of the data which is received by the receiving means;
    a first distinguishing means for distinguishing whether or not a text, an image, and a display information by which it can be distinguished whether display of the image as a background image for the text is instructed are included in the data received by the receiving means;
    a first display control means for controlling the displaying means so as to display the image as the background for the text when the first distinguishing means distinguishes that the text, the image, and the display information by which it can be distinguished that display of the image as a background image for the text is instructed are included in the data received by the receiving means;

a second display control means for controlling the displaying means so as to display a configuration removing the text or the image from the configuration displayed by the first display control means; and a third distinguishing means for distinguishing whether or not a template having a brightness filter function is included in the data which is received by the receiving means;

wherein the first display control means corrects the brightness of the image and displays the image as a background image for the text by overlaying the template with the image upon display of the image as the background image for the text when the third distinguishing means distinguishes that the template having the brightness filter function is included in the data; and the second display control means controls the displaying means so as to remove the text from a configuration displayed by the first display control means and display a configuration of the image having the template removed.

2. The data reception apparatus according to claim 1, further comprising:

an input means for inputting an instruction given by a user of the data reception apparatus to switch a display due to the first display control means into a display due to the second display control means; and an instructing means for giving an instruction to switch the display to the display due to the second display control means on the basis of the instruction inputted by the input means when the image is displayed as the background image for the text by the first display control means;

wherein the second display control means controls the displaying means so as to display a configuration removing the text or the image from the configuration displayed by the first display control means depending on the instruction from the instructing means.

3. The data reception apparatus according to claim 2, wherein the second display control means controls the displaying means so as to display a condition having the text or the image removed by gradually erasing the display of the text or the display of the image from the condition displayed by the first display control means.

4. A data reception method for receiving one set of data including at least an image and a text from an external device via a communication network, comprising:

a receiving step of receiving data;

a displaying step of displaying the text on a display part on the basis of the data which is received at the receiving step;

a distinguishing step of distinguishing whether or not a text, an image, and a display information by which it can be distinguished whether display of the image as a background image for the text is instructed are included in the data received at the receiving step;

a first display control step of controlling the display part so as to display the image as the background for the text when it is distinguished at the distinguishing step that the text, the image, and the display information by which it can be distinguished that display of the image as a background image for the text is instructed are included in the data received at the receiving step; and a second display control step of controlling the display part so as to display a configuration removing the text or the image from the configuration displayed at the first display control step and a third distinguishing step of distinguishing whether or not a template having a brightness filter function is included in the data which is received at the receiving step;

wherein the brightness of the image is corrected and the image is displayed at the first control step as a background image for the text by overlaying the template with the image upon display of the image as the background image for the text when it is distinguished at the third distinguishing step that the template having the brightness filter function is included in the data; and the display part is controlled at the second control step so as to remove the text from a configuration displayed at the first display control step and display a configuration of the image having the template removed.

5. A non-transitory computer readable storage medium for which has a computer control a apparatus mounted on a data reception apparatus for sending one set of data including at least an image and a text to an external device via a communication network, wherein the data reception apparatus is provided with a computer and a displaying unit, the storage medium non-transitorily storing a program, when executed, to make the computer perform:

a receiving function for receiving data;

a displaying function for displaying the text on the displaying unit on the basis of the data which is received by the receiving function;

a distinguishing function for distinguishing whether or not a text, an image, and a display information by which it can be distinguished whether display of the image as a background image for the text is instructed are included in the data received by the receiving function;

a first display control function for controlling the displaying unit so as to display the image as the background for the text when the distinguishing function distinguishes that the text, the image, and display information by which it can be distinguished that display of the image as a background image for the text is instructed are included in the data received by the receiving function; and a second display control function for controlling the displaying unit so as to display a configuration removing the text or the image from the configuration displayed by the first display control function a third distinguishing function for distinguishing whether or not a template having a brightness filter function is included in the data which is received by the receiving function;

wherein the first display control function corrects the brightness of the image and displays the image as a background image for the text by overlaying the template with the image upon display of the image as the background image for the text when the third distinguishing function distinguishes that the template having the brightness filter function is included in the data; and the second display control function controls the displaying unit so as to remove the text from a configuration displayed by the first display control function and display a configuration of the image having the template removed.

* * * * *